US012665286B2

(12) United States Patent
Murao et al.

(10) Patent No.: US 12,665,286 B2
(45) Date of Patent: Jun. 23, 2026

(54) ANTENNA APPARATUS, COMMUNICATION APPARATUS, AND IMAGE CAPTURING SYSTEM

(71) Applicant: CANON KABUSHIKI KAISHA, Tokyo (JP)

(72) Inventors: Tatsuya Murao, Kanagawa (JP); Yasushi Koyama, Kanagawa (JP); Yuki Kitazawa, Kanagawa (JP); Takeaki Itsuji, Kanagawa (JP); Koji Yukimasa, Kanagawa (JP); Takahiro Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/905,450

(22) Filed: Oct. 3, 2024

(65) Prior Publication Data

US 2025/0030148 A1 Jan. 23, 2025

Related U.S. Application Data

(63) Continuation of application No. PCT/JP2023/014968, filed on Apr. 13, 2023.

(30) Foreign Application Priority Data

Apr. 15, 2022 (JP) ................................. 2022-067822

(51) Int. Cl.

*H01Q 1/22* (2006.01)
*H01Q 5/50* (2015.01)
*H01Q 9/04* (2006.01)

(52) U.S. Cl.

CPC ............ *H01Q 1/2283* (2013.01); *H01Q 5/50* (2015.01); *H01Q 9/0414* (2013.01)

(58) Field of Classification Search

CPC ...... H01Q 1/2283; H01Q 5/50; H01Q 9/0414; H01Q 3/34; H01Q 23/00; H01Q 21/06; H03B 7/08; H03B 5/18

See application file for complete search history.

(56) References Cited

U.S. PATENT DOCUMENTS 6,456,215 B1 9/2002 Frazier
7,924,107 B2 4/2011 Koyama
(Continued)

FOREIGN PATENT DOCUMENTS

CN 114270701 A 4/2022
EP 4203027 A1 6/2023
(Continued)

OTHER PUBLICATIONS

Masahiro Asada et al., "Theoretical analysis of coupled oscillator array using resonant tunneling diodes in subterahertz and terahertz range", Journal of Applied Physics 103, 124514, 2008.
(Continued)

*Primary Examiner* — Awat M Salih
(74) *Attorney, Agent, or Firm* — VENABLE LLP

(57) ABSTRACT

An antenna apparatus comprises, on a semiconductor substrate, a first active antenna including a first antenna configured to transmit or receive a first electromagnetic wave of a first frequency, and a first negative-resistance element; an oscillation unit including a resonance unit and a second negative-resistance element configured to generate a second electromagnetic wave by oscillating at a second frequency; a coupling wire configured to electrically connect the first active antenna and the oscillation unit; a first wiring electrically connected to the first negative-resistance element and configured to receive a first bias signal to be supplied to the first negative-resistance element; and a second wiring electrically connected to the second negative-resistance ele-
(Continued)

ment and configured to receive a second bias signal to be supplied to the second negative-resistance element.

36 Claims, 26 Drawing Sheets

(56) References Cited

U.S. PATENT DOCUMENTS

| | | | | |
|---|---|---|---|---|
| 8,451,069 | B2 | 5/2013 | Sekiguchi | |
| 8,686,916 | B2 | 4/2014 | Yukimasa | |
| 9,184,697 | B2 | 11/2015 | Sekiguchi | |
| 9,391,428 | B2 | 7/2016 | Koyama | |
| 9,680,000 | B2 | 6/2017 | Jang et al. | |
| 9,825,369 | B2 | 11/2017 | Takasaki | |
| 9,899,959 | B2 | 2/2018 | Feiginov | |
| 11,300,602 | B1 | 4/2022 | Kuppuswamy | |
| 11,442,338 | B2 | 9/2022 | Itsuji | |
| 11,515,625 | B2 | 11/2022 | Driscoll | |
| 11,626,839 | B2 | 4/2023 | Koyama | |
| 11,831,063 | B2 * | 11/2023 | Koyama | H03B 5/1243 |
| 12,218,441 | B2 | 2/2025 | Koyama | |
| 2002/0093396 | A1 | 7/2002 | Smith | |
| 2005/0285541 | A1 | 12/2005 | Lechevalier | |
| 2007/0279136 | A1 | 12/2007 | Koyama | |
| 2014/0266477 | A1 * | 9/2014 | Sekiguchi | H01Q 1/38 331/96 |
| 2017/0155361 | A1 | 6/2017 | Suzuki | |
| 2017/0170785 | A1 | 6/2017 | Tousi | |
| 2020/0111929 | A1 | 4/2020 | Kandori | |
| 2020/0243458 | A1 | 7/2020 | Yoshioka | |
| 2020/0266762 | A1 | 8/2020 | Kandori | |
| 2021/0041293 | A1 | 2/2021 | Ramisetti | |
| 2021/0067094 | A1 * | 3/2021 | Kandori | H03B 5/129 |
| 2021/0067095 | A1 | 3/2021 | Kandori | |
| 2021/0091722 | A1 | 3/2021 | Koyama | |
| 2021/0410100 | A1 | 12/2021 | Balasubramanian | |
| 2022/0057519 | A1 | 2/2022 | Goldstein | |
| 2022/0114769 | A1 | 4/2022 | Omori | |
| 2022/0173515 | A1 | 6/2022 | Koyama | |
| 2022/0416382 | A1 | 12/2022 | Woods, Jr. | |
| 2023/0155292 | A1 | 5/2023 | Koyama | |
| 2023/0163801 | A1 | 5/2023 | Wiegner | |
| 2023/0207500 | A1 | 6/2023 | Koyama | |
| 2023/0208359 | A1 | 6/2023 | Koyama | |
| 2023/0251368 | A1 | 8/2023 | Rogers | |
| 2023/0258793 | A1 | 8/2023 | Itsuji | |
| 2023/0262312 | A1 | 8/2023 | Koyama | |
| 2023/0282970 | A1 | 9/2023 | Koyama | |
| 2023/0284907 | A1 | 9/2023 | Wang | |
| 2023/0335885 | A1 | 10/2023 | Yukimasa | |
| 2023/0335898 | A1 | 10/2023 | Koyama | |
| 2023/0378637 | A1 * | 11/2023 | Goden | H01Q 1/2283 |
| 2024/0410996 | A1 | 12/2024 | Kawano | |
| 2025/0030426 | A1 | 1/2025 | Kitazawa | |

FOREIGN PATENT DOCUMENTS

| | | | |
|---|---|---|---|
| GB | 2613891 | A | 6/2023 |
| JP | H05-67919 | A | 3/1993 |
| JP | 2014-200065 | A | 10/2014 |
| JP | 6373010 | B2 | 8/2018 |
| JP | 2020-36311 | A | 3/2020 |
| JP | 2021-34908 | A | 3/2021 |
| JP | 2021-52276 | A | 4/2021 |
| JP | 2021-63781 | A | 4/2021 |
| JP | 2022-23418 | A | 2/2022 |
| JP | 2022-70824 | A | 5/2022 |
| JP | 2023-157733 | A | 10/2023 |
| JP | 2023-157734 | A | 10/2023 |
| JP | 2023-157735 | A | 10/2023 |
| JP | 2023-157736 | A | 10/2023 |
| JP | 2023-157737 | A | 10/2023 |
| KR | 10-2016-0069145 | A | 6/2016 |
| KR | 20170004965 | A | 1/2017 |
| KR | 20220008036 | A | 1/2022 |
| WO | 2008/120826 | A1 | 10/2008 |

OTHER PUBLICATIONS

Masahiro Asada et al., “Resonant Tunneling Diodes for Sub-Terahertz and Terahertz Oscillators,” Japanese Journal of Applied Physics, vol. 47, No. 6 (2008), pp. 4375-4384.

Safumi Suzuki, Kenta Urayama, and Masahiro Asada, “Coherent Power Combination in Multi-Element Sub-THz RTD Oscillators Coupled With MIM Stub Structure”, 2008 20th International Conference on Indium Phosphide and Related Materials, 2008.

Korean Office Action issued Jun. 14, 2025 during prosecution of related Korean patent application No. 10-2023-0045760. (English translation included).

Extended European Search Report issued Nov. 5, 2025 during prosecution of related application No. EP 23788382.

U.S. Appl. No. 18/854,907, filed Oct. 7, 2024 by Yasushi Koyama.

Korean Notice of Allowance issued Oct. 28, 2025 during prosecution of related Korean Patent Application No. 10-2024-7031756 (English translation included).

Extended European Search Report issued Jan. 26, 2026 during prosecution of corresponding European Application No. 23788384. 8.

“Beam Control in Unilaterally Coupled Active Antennas with Self-Oscillating Harmonic Mixers”, by M. Sanagi, et al., IEICE Transactions on Electronics, Institute of Electronics, Tokyo, JP, vol. E88-C, No. 7, Jul. 30, 2005; pp. 1375-1381, figures 1, 2 and 6.

“A Self Mixing Active Antenna for Communication and Vehicle Identification Applications,”, by C. M. Montiel, et. al., 1996 IEEE MTT-S International Microwave Symposium Digest, San Francisco, Jun. 17-21, 1996, New York, IEEE, UI, Jun. 17, 1996, pp. 333-3336, figure 6.

“Tetrahertz coherent receiver using a single resonant tunnelling diode”, by Nishida Yousuke, et al., Scientific Reports, vol. 9, No. 1, Dec. 2, 2019, figure 3.

“Surface-Wave Coupling of Active Antennas for Homodyne Sensor Systems”, by R.H. Rasshofer, et. al. IEEE Transaction on Microwave Theory and Techniques, IEEE, USA, vol. 46, No. 12, Part 02, Dec. 31, 1998, pp. 2457-2567, figure 2.

York et al., “Injection- and Phase-Locking Techniques for Beam Control”, IEEE Transactions on Microwave Theory And Techniques, Nov. 1998, vol. 46, No. 11, pates 1920-1929, XP-000785381 (cited in OA dated Apr. 6, 2026 in U.S. Appl. No. 18/905,775).

* cited by examiner

TOP VIEW

ANTENNA APPARATUS, COMMUNICATION APPARATUS, AND IMAGE CAPTURING SYSTEM

CROSS-REFERENCE TO RELATED APPLICATIONS

This application is a Continuation of International Patent Application No. PCT/JP 2023/014968, filed Apr. 13, 2023, which claims the benefit of Japanese Patent Application No. 2022-067822, filed Apr. 15, 2022, both of which are hereby incorporated by reference herein in their entirety.

BACKGROUND OF THE INVENTION

Field of the Invention

The present invention relates to an antenna apparatus, a communication apparatus, and an image capturing system.

Background Art

In recent years, as data communication by electromagnetic waves, wireless communication in a high-frequency region such as a terahertz wave that is expected to be utilized is receiving attention. An oscillation source that generates a carrier wave is necessary to transmit/receive signals. However, in a semiconductor device used in a terahertz wave region, there is known an application that uses a high-frequency signal of an oscillation circuit using a negative-resistance element formed on a compound semiconductor substrate such as an InP or GaAs substrate. In addition, since the influence of the impedance of a transmission line is large in transmission of a high-frequency signal in a terahertz band or the like, there is proposed a radiation type oscillation element that integrates antennas by the pattern or structure of an FR4-based substrate or the like and structurally and functionally fuse them. PTL 1 discloses a reception element that performs synchronization and detection when an active element using a resonant tunneling diode excites the oscillation frequency of the resonant tunneling diode to the frequency of an injection locking signal by injection locking by electromagnetic waves entering an antenna.

CITATION LIST

Patent Literature

PTL 1: International Publication No. 2008/120826

Non Patent Literature

NPL 1: Masahiro Asada et al., "Resonant Tunneling Diodes for Sub-Terahertz and Terahertz Oscillators", Japanese Journal of Applied Physics, Vol. 47, No. 6, 2008, pp. 4375-4384

In PTL 1, as shown in FIG. 25, when an oscillation signal is input from an external oscillator 2500, injection locking is performed for a radiation type oscillator (a rear side of 2501). At this time, the influence of the impedance of a transmission path may be large in a high-frequency band such as a terahertz wave, and signal quality may deteriorate due to a decrease in amplitude and disturbance of a waveform caused by a loss of an oscillation signal, thereby degrading reliability and stability of a device.

SUMMARY OF THE INVENTION

The present invention has been made in consideration of the above-described problem, and has as its object to provide a technique capable of preventing deterioration in signal quality of an oscillation signal supplied to an antenna.

To achieve the above object, an antenna apparatus according to the present invention is characterized by comprising: on a semiconductor substrate, a first active antenna including a first antenna configured to transmit or receive a first electromagnetic wave of a first frequency, and a first negative-resistance element; an oscillation unit including a resonance unit and a second negative-resistance element configured to generate a second electromagnetic wave by oscillating at a second frequency; a coupling wire configured to electrically connect the first active antenna and the oscillation unit; a first wiring electrically connected to the first negative-resistance element and configured to receive a first bias signal to be supplied to the first negative-resistance element; and a second wiring electrically connected to the second negative-resistance element and configured to receive a second bias signal to be supplied to the second negative-resistance element.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
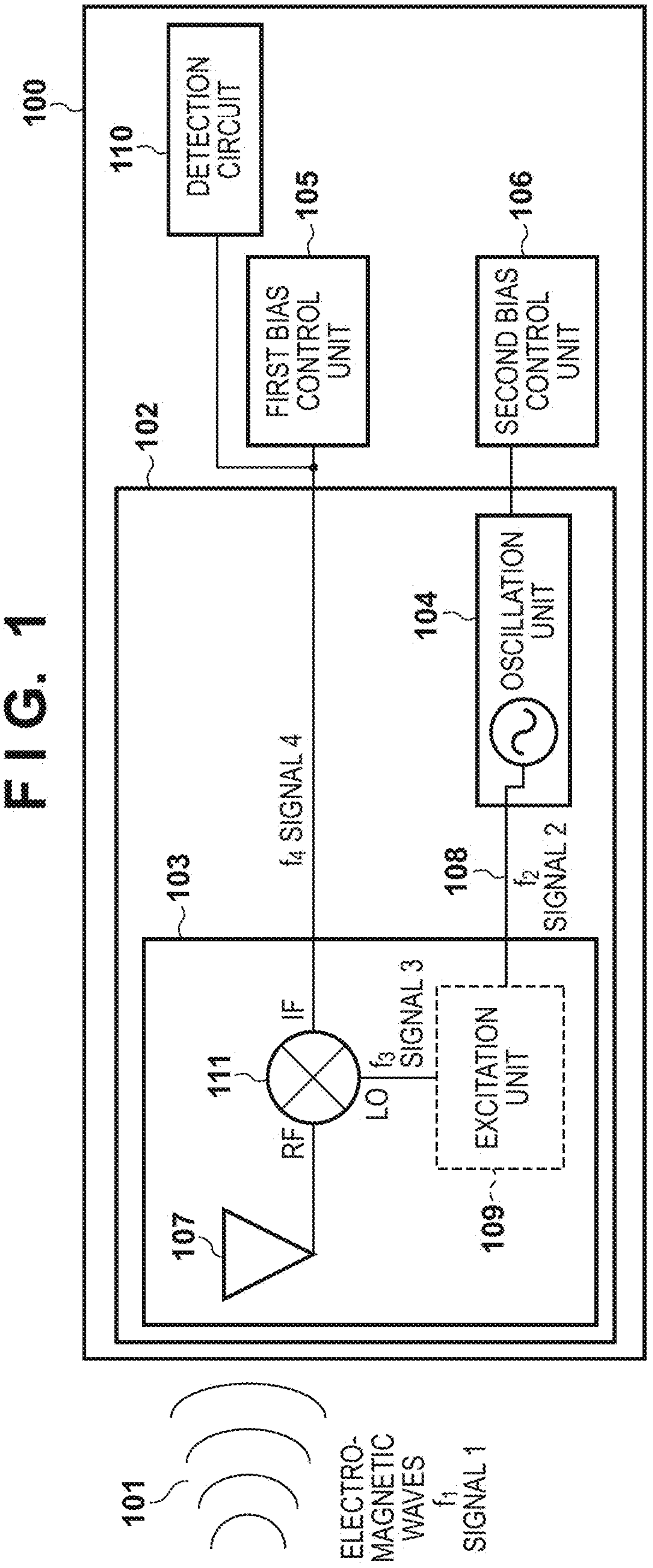
FIG. 1 is a block diagram showing an antenna apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following description, a case in which an antenna apparatus is used as a reception apparatus that detects a terahertz wave will be described but the antenna apparatus can also be used as a transmission apparatus that emits a terahertz wave. A terahertz wave indicates an electromagnetic wave within a frequency range of 10 GHz (inclusive) to 100 THz (inclusive), for example, a frequency range of 30 GHz (inclusive) to 30 THz (inclusive).

First Embodiment

FIG. 1 is a block diagram showing the arrangement of a reception apparatus 100 applicable to a terahertz wave according to this embodiment. The reception apparatus 100 is configured to receive an electromagnetic wave called a terahertz wave 101 entering from the outside. In this embodiment, the frequency of the terahertz wave 101 is defined as $f_1$ and a signal name is defined as a signal 1. The reception apparatus 100 includes a semiconductor substrate 102, a first bias control unit 105, a second bias control unit 106, and a detection circuit 110 serving as a detection unit. The semiconductor substrate 102 is a substrate made of a semiconductor material including an element semiconductor using a silicon (Si), germanium (Ge), or the like, and a compound semiconductor such as a gallium arsenide (GaAs), indium phosphide (InP), or gallium nitride (GaN) substrate. The semiconductor substrate 102 can be called a chip or die. The semiconductor substrate 102 includes an active antenna 103 and an oscillation unit 104. Furthermore, the active antenna 103 and the oscillation unit 104 are connected to the first bias control unit (first bias control circuit) 105 and the second bias control unit (second bias control circuit) 106 outside the semiconductor substrate 102, respectively. The semiconductor substrate 102 is an example of an antenna apparatus according to this embodiment.

The active antenna 103 includes an upper conductor 107 connected to a negative-resistance element. The upper conductor 107 forms a part of a resonance structure. The active antenna 103 can oscillate by the resonance structure in the active antenna 103 and a negative resistance generated by the negative-resistance element. The negative-resistance element indicates an element having a negative resistance as the characteristic between terminals, and this embodiment assumes that the negative-resistance element serves as a resonant tunneling diode (RTD). However, the negative-resistance element may be a two-terminal element such as an IMPATT (Impact Ionization Avalanche Transit-Time) diode or a Gunn diode. Alternatively, the negative-resistance element may be a transistor other than a two-terminal transistor, such as a Field Effect Transistor (FET) or Bipolar Junction Transistor (BJT). That is, the negative-resistance element is not limited to them as long as it generates a negative resistance between the terminals to satisfy an oscillation condition by the resonance structure in the active antenna 103 and can be formed on a semiconductor substrate.

The oscillation unit 104 is also formed by the above-described negative-resistance element and resonance structure, and is configured to oscillate at a natural frequency $f_2$. Furthermore, the first bias control unit 105 and the second bias control unit 106 are connected to the active antenna 103 and the oscillation unit 104, respectively, and a bias voltage is applied to each negative-resistance element. Each of the bias control units 105 and 106 controls the bias voltage based on power input from the outside of the reception apparatus 100. Furthermore, in order to stabilize a relatively high frequency of 0.1 to 10 GHz in each resonance structure, an AC (alternating current) short-circuit may be arranged in each of the bias control units 105 and 106 or in a bias path from each of the bias control units 105 and 106 to the negative-resistance element. More specifically, a circuit obtained by series-connecting a resistance layer using TiW and a MIM (Metal-Insulator-Metal) capacitor structure may be arranged. In this case, the MIM capacitor has a large capacitance within the above-described frequency range, and has, for example, a capacitance of about several pF. Each bias control unit continuously or intermittently applies a predetermined bias voltage. A coupling wire 108 is a metal wire that electrically connects the active antenna 103 and the oscillation unit 104, and is a microstrip line patterned on the semiconductor substrate 102 in an example.

The second bias control unit 106 causes the oscillation unit 104 to oscillate by applying a bias voltage that generates a negative resistance in the negative-resistance element, thereby generating a signal 2 having the frequency $f_2$. The signal 2 is propagated from the oscillation unit 104 to the active antenna 103 via the coupling wire 108. The active antenna 103 is excited by the signal 2 to generate a signal 3 of a frequency $f_3$ in the active antenna 103. An excitation unit 109 is a resonance structure in the active antenna 103 and has a function of synchronizing the active antenna 103 with the signal 2. When the first bias control unit 105 applies a bias voltage that generates a positive resistance in the negative-resistance element of the active antenna 103, the resonance structure in the active antenna resonates by excitation, thereby generating the signal 3 having the frequency $f_3$.

Furthermore, the detection circuit 110 that detects a received signal is connected to a first bias path from the first bias control unit 105 to the negative-resistance element. A connection arrangement from the first bias path to the detection circuit 110 will be described later. The active antenna 103 includes the excitation unit 109 and a mixer 111 as functions formed from the negative-resistance element, the antenna, a peripheral resonance unit, and the like. These functions may be held by a unique element in the active antenna or implemented by a combination of a plurality of elements or structures.

Figure 2:
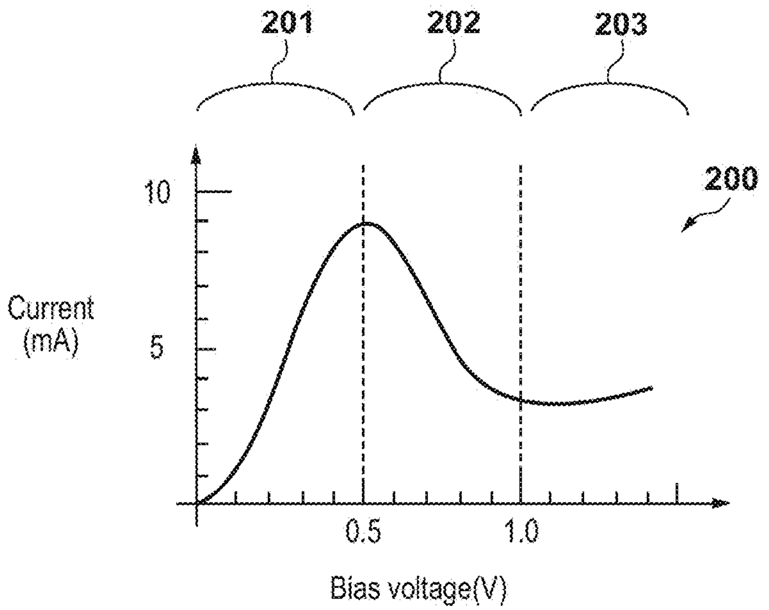
FIG. 2 is a graph of the IV curve of a negative-resistance element according to the first embodiment.

FIG. 2 shows a graph 200 of an IV curve obtained by plotting a current amount flowing when a bias voltage is applied to the negative-resistance element. The abscissa represents the bias applied voltage [V] and the ordinate represents the current amount [mA]. As shown in the graph 200, the current amount increases as the bias voltage is gradually increased from 0 V to 0.5 V. This range of the bias voltage is set as a first region 201. Similarly, a second region 202 where the current amount decreases after a peak at 0.5 V as the bias voltage is increased to a voltage around 1.0 V, and a third region 203 where the current amount increases again as the voltage is increased from the appearance of the voltage around 1.0 V. The second region 202 where the current amount decreases as the bias voltage is increased is called a negative-resistance region, and the first region 201 and the third region 203 where the current amount increases as the bias voltage is increased are called positive-resistance regions. As shown in the graph 200, it is possible to control, by the bias voltage to be applied, whether the negative-resistance element operates in the positive-resistance region or the negative-resistance region. Note that the IV curve is an example for the descriptive purpose, and the values of the bias voltage and current are not limited to these. In this embodiment, the first bias control unit 105 is controlled to apply such bias voltage that the negative-resistance element of the active antenna 103 operates in the first region 201 or the third region 203.

Figure 3:
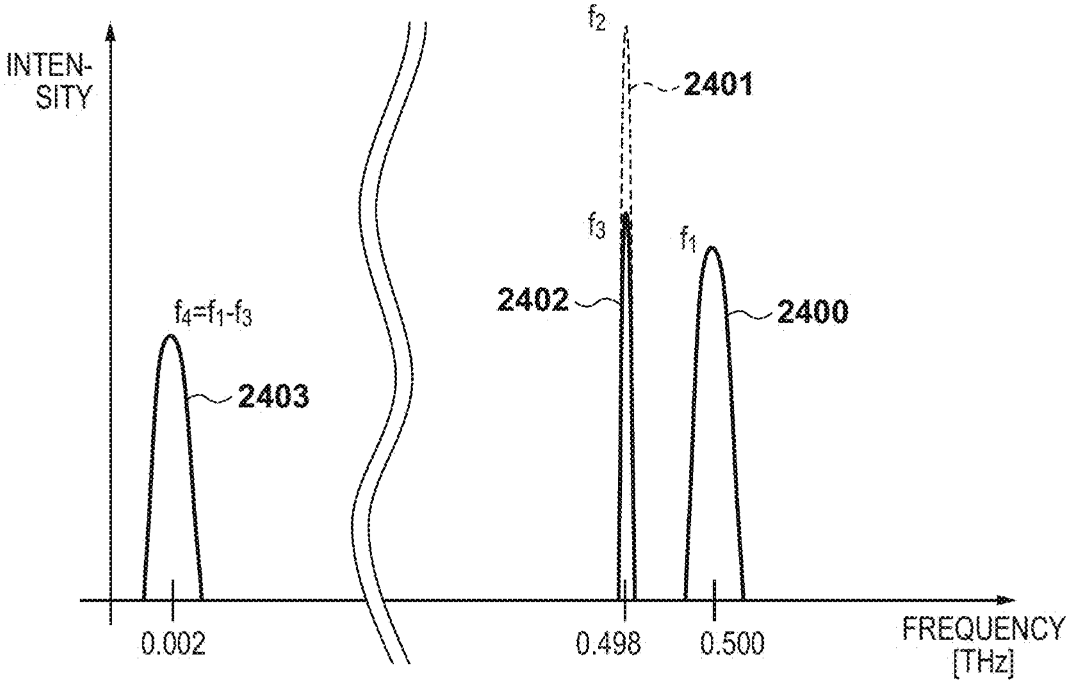
FIG. 3 is a graph showing an example of frequency conversion of a frequency mixer according to the first embodiment.

The electromagnetic wave reception and detection operations will be described next with reference to FIGS. 1 and 3. FIG. 3 is a graph for explaining the operation of the mixer, in which the abscissa represents a frequency [THz] and the ordinate represents intensity. First, the active antenna 103 receives the signal 1 as a reception RF signal of the terahertz wave 101 by the upper conductor 107. The signal 1 is modulated with reference to the frequency $f_1$, and is shown as a peak 2400 of the frequency $f_1$ THz in FIG. 3. The signal 1 excites the active antenna 103. In addition, the signal 2 oscillated by the oscillation unit 104 is input to the active antenna 103 through the coupling wire 108. The signal 2 oscillates at the frequency $f_2$, and is shown as a peak 2401 of the frequency $f_2$ THz in FIG. 3. The peak 2401 is a reference oscillation signal and the frequency band is narrower than that of the peak 2400. The signal 2 also excites the active antenna 103 to generate the signal 3. A peak 2402 indicates the intensity of an electromagnetic wave on the active antenna 103 obtained by receiving and oscillating the peak 2401, and the intensity lowers by an amount corresponding to an antenna loss, as compared with the peak 2401. Since the frequencies $f_2$ and $f_3$ of the signals 2 and 3 are the same, $f_2=f_3$ is obtained. Note that as shown in FIG. 3, the frequencies $f_1$ to $f_3$ of the signals 1 to 3 and a frequency $f_4$ of a signal 4 are center frequencies, and each signal may have a predetermined frequency width in a case where the signal is a modulation signal.

The signals 1 and 3 generated in the active antenna 103 excite the negative-resistance element and the resonance unit provided in the active antenna 103. At this time, the negative-resistance element operates as the mixer 111 due to the non-linearity of the negative-resistance element, and mixes the signals 1 and 3 to generate the signal 4 as a detection signal. The signal 4 is generated as a signal having the frequency $f_4$, and is shown as a peak 2403 in FIG. 3. Since the frequency $f_4$ of the signal 4 corresponds to the difference between the frequency $f_1$ of the signal 1 and the frequency $f_3$ of the signal 3, $f_1-f_3=f_4$ holds. The intensity of the peak 2403 is lower than that of the peak 2400 due to a loss by the mixer 111. By setting the frequencies $f_1$ and $f_3$ to frequencies relatively close to each other in the terahertz band, the signal 4 having the frequency corresponding to the difference between the frequencies $f_1$ and $f_3$ is a low-frequency signal. FIG. 3 shows only the signal having a frequency component of the frequency $f_4$, which is necessary for a detection signal, but a signal having a plurality of frequency components different from the frequency $f_4$ may be generated by mixing.

When $f_1=0.500$ THz and $f_3=0.498$ THz are set as practical examples of frequencies, a signal of $f_1-f_3=f_4=0.002$ THz, that is, 2 GHz is obtained. Since the signal 4 has a frequency lower than the terahertz band, a detection apparatus similar to an existing detection apparatus for a gigahertz band can be used as the detection circuit 110. If, as described above, $f_1$ and $f_3$ are different frequencies included in a predetermined frequency band ($f_1 \neq f_3=f_2$), it is possible to make the active antenna 103 function as a heterodyne down-converter (heterodyne detector). A mixer operation can be performed using the signal 1 as an RF input and the signal 3 as an LO (local oscillator) input which is a local oscillation signal, thereby outputting the down-converted signal 4 as an IF signal. Since the reception apparatus of this embodiment operates as a heterodyne detector, it is possible to perform detection using a superheterodyne method for the detection circuit 110.

By setting the frequency $f_3$ of the signal 3 to the same frequency as the frequency $f_1$ of the signal 1 ($f_1=f_3=f_2$), it is possible to make the active antenna 103 function as a homodyne down-converter. The homodyne method is also called a zero IF method since the frequency $f_4$ of the signal 4 is 0 Hz. At this time, as the detection circuit 110, a detection circuit using a direct conversion method can be used. In the circuit arrangement according to this embodiment, a general-purpose reception device capable of coping with both the heterodyne method and the homodyne method can be configured by appropriately setting the frequency $f_2$ of the oscillation unit 104.

Figure 4:
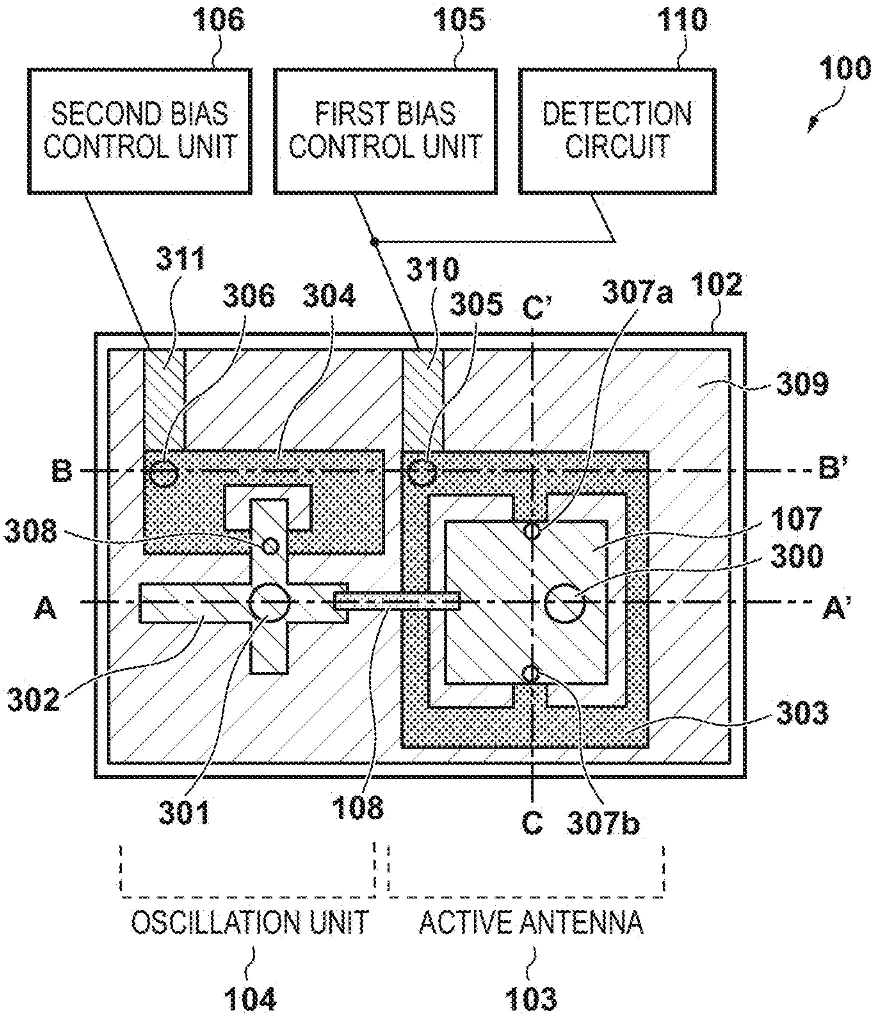
FIG. 4 is a schematic plan view of a semiconductor substrate according to the first embodiment.
Figure 5A:
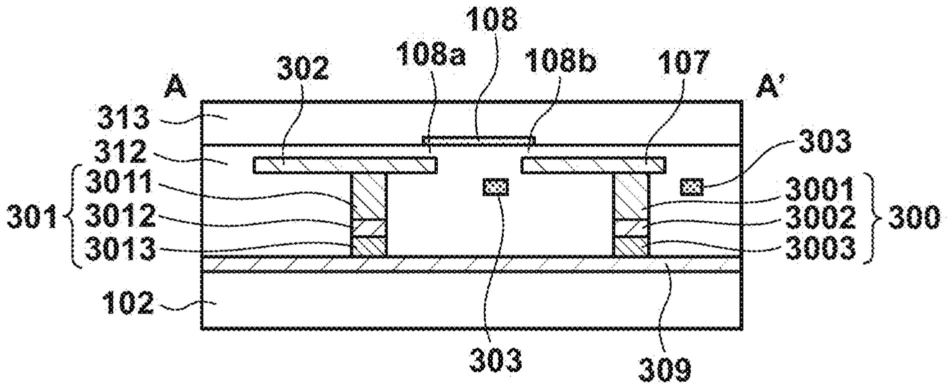
FIG. 5A is a schematic sectional view of the semiconductor substrate according to the first embodiment.
Figure 5B:
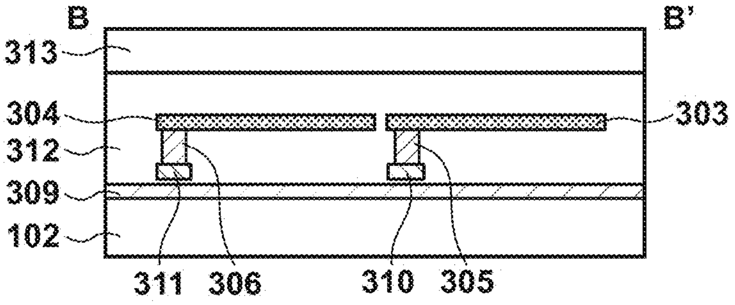
FIG. 5B is a schematic sectional view of the semiconductor substrate according to the first embodiment.
Figure 5C:
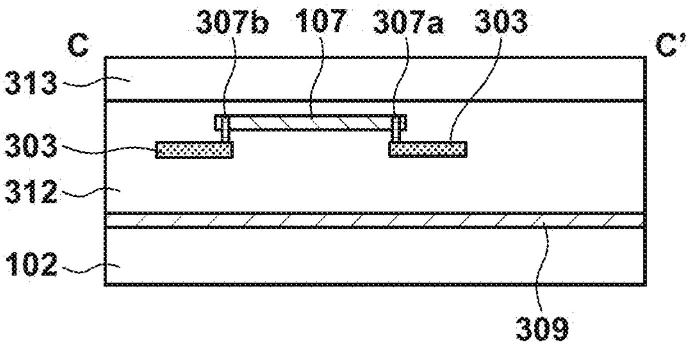
FIG. 5C is a schematic sectional view of the semiconductor substrate according to the first embodiment.

An example of the structure of the semiconductor substrate 102 according to this embodiment will be described next with reference to FIGS. 4 and 5A to 5C. FIG. 4 is a schematic plan view of the semiconductor substrate 102. FIGS. 5A to 5C are schematic sectional views of the substrate 102 shown in FIG. 4, taken along lines A-A', B-B', and C-C', respectively. The structure described here is an example simplified in order to explain this embodiment and is not limited to this.

A right portion in FIG. 4 shows the active antenna 103, and a rectangular portion located at the center of the active antenna indicates the upper conductor 107 of the antenna. This embodiment assumes that the antenna is a microstrip rectangular patch antenna. In another example, as the antenna, any antenna that can be formed on a semiconductor substrate, such as a dipole antenna, log-periodic antenna, bow-tie antenna, slot antenna, or loop antenna, can appropriately be adopted. A first negative-resistance element 300 is arranged near the center of the upper conductor 107, and the stacked structure of a Resonant Tunneling Diode (RTD) and a wiring for electrical connection are formed in this portion. FIG. 5A shows the sectional structure of a corresponding portion, and a via 3001 formed by a via connected to the upper conductor 107 or the like, a semiconductor layer 3002, and an RTD 3003 are connected. In other words, one terminal of the first negative-resistance element 300 is electrically connected to the upper conductor 107, and another terminal of the first negative-resistance element 300 is electrically connected to a GND layer 309. Note that the GND layer 309 will sometimes be referred to as a GND layer 409 hereinafter. The mixer 111 in the functional block diagram shown in FIG. 1 corresponds to the upper conductor 107 and the first negative-resistance element 300 shown in FIG. 5A. In addition, the excitation unit 109 corresponds to the upper conductor 107. In this embodiment, the upper conductor 107 and the negative-resistance element 300 are integrated but a resonance unit formed by a metal conductor may additionally be provided around the first negative-resistance element 300, and the resonance unit and the upper conductor 107 may be connected to each other. That is, the connecting form of the active antenna 103 and the first negative-resistance element 300 is not limited to the structure of this embodiment.

Furthermore, feeding vias 307*a* and 307*b* each of which supplies power to the upper conductor 107 in FIG. 4 are provided on the upper and lower sides of the upper conductor 107, and a feeding path for applying a bias voltage to the negative-resistance element 300 is provided. The bias voltage is supplied, to a first bias wiring 310 in FIG. 4, from the first bias control unit 105 outside the semiconductor substrate 102. The first bias wiring 310 connects a first bias conductive layer 303 by a first bias via 305, and is connected from the first bias conductive layer 303 to the feeding vias 307*a* and 307*b*. The first bias via 305 is connected to the first bias conductive layer 303 for bias of the first negative-resistance element 300. The bias voltage is supplied to the first negative-resistance element 300 via the first bias path including these paths. The first bias path also includes a path from a power supply unit that generates a bias voltage to the semiconductor substrate 102, exists inside and outside the semiconductor substrate 102, and is not limited to the above-described components.

The width of each of the feeding vias 307*a* and 307*b* is smaller than that of the upper conductor 107. The width of the portion (connection portion) of the first bias conductive layer 303 connected to the feeding vias 307*a* and 307*b* is smaller (thinner) than the width of the active antenna 103. The widths of the feeding vias 307*a* and 307*b*, the upper conductor 107, and the connection portion of the first bias conductive layer 303 correspond to lengths in the electromagnetic wave resonance direction (A-A' direction) in the active antenna 103. These widths are equal to or smaller than 1/10 ($\lambda/10$) of an effective wavelength $\lambda$ of the standing terahertz wave of an oscillation frequency in the active antenna 103. This can prevent the feeding vias 307*a* and 307*b* and the first bias conductive layer 303 from interfering with a resonance electric field in the active antenna 103 to decrease the radiation efficiency of the active antenna 103.

Furthermore, each of the positions of the feeding vias 307*a* and 307*b* is arranged at the node (that is, a position at which the electric field of the standing wave of a terahertz wave becomes zero) of the electric field of the standing terahertz wave of the oscillation frequency in the active antenna 103. At this time, the feeding vias 307*a* and 307*b* and the first bias conductive layer 303 are configured so that the impedance is sufficiently higher than the absolute value of the negative differential resistance of the RTD as the first negative-resistance element 300 in the frequency band around the oscillation frequency. In other words, the feeding vias 307*a* and 307*b* and the first bias conductive layer 303 are connected to the active antenna 103 so as to obtain a high impedance when viewed from the RTD at the oscillation frequency. In this case, the active antenna 103 is isolated (separated) in a bias wiring path at the oscillation frequency. Thus, a current of the oscillation frequency induced by each active antenna does not influence the adjacent antenna via the first bias wiring 310 and the first bias control unit 105. In addition, interference between the standing electric field of the oscillation frequency in the active antenna 103 and the power supply members is suppressed.

On the left side of FIG. 4, the oscillation unit 104 is provided. The oscillation unit 104 is formed by a microstrip-line resonator, and mainly includes a second negative-resistance element 301 and a resonance unit 302. Similar to the first negative-resistance element 300, the second negative-resistance element 301 includes a via 3011, a semiconductor layer 3012, and an RTD 3013 shown in FIG. 5A, and electrically connects the resonance unit 302 and the GND layer 309. In addition, a feeding via 308 that supplies power to the resonance unit 302 is provided in a part of the resonance unit 302 shown in FIG. 4, and a feeding path for applying a bias voltage to the second negative-resistance element 301 is provided. The second bias control unit 106 supplies the bias voltage from the outside of the semiconductor substrate 102 to a second bias wiring 311 shown in FIG. 4. The second bias wiring 311 connects a second bias conductive layer 304 by a second bias via 306, and is connected from the second bias conductive layer 304 to the feeding via 308. The bias voltage is supplied to the second negative-resistance element 301 via these connections. A bias path inside and outside the semiconductor substrate 102 will be referred to as a second bias path hereinafter. In this embodiment, the first bias control unit 105 and the second bias control unit 106 are configured to individually apply the bias voltages to the first negative-resistance element 300 and the second negative-resistance element 301, but the supplied bias voltage and control may be common. As shown in FIG. 5A, the first negative-resistance element 300 and the second negative-resistance element 301 are formed in the same layer, thereby suppressing variations of the characteristics of the first negative-resistance element 300 and the second negative-resistance element 301. Note that the widths of the first bias via 305 and the second bias via 306 are larger than the widths of the feeding vias 307*a* and 307*b*. The width can be a length along a B—B' direction.

The feeding via 308 and a portion (connection portion) of the second bias conductive layer 304 connected to the feeding via 308 are the same as the feeding vias 307*a* and 307*b* and the first bias conductive layer 303, respectively. The feeding via 308 is a connection portion for electrically and mechanically connecting the second bias wiring 311 to the resonance unit 302. In addition to the role as a member forming the microstrip-line resonator, the resonance unit 302 is connected to these vias to serve as an electrode for injecting a current into the second negative-resistance element 301. The position of the feeding via 308 is also arranged at the node of the electric field of the standing terahertz wave of the oscillation frequency in the resonance unit 302. At this time, the feeding via 308 and the second bias conductive layer 304 are configured so that the impedance is sufficiently higher than the absolute value of the negative differential resistance of the RTD as the second negative-resistance element 301 in the frequency band around the oscillation frequency. In other words, the feeding via 308 and the second bias conductive layer 304 are connected to the resonance unit 302 so as to obtain a high impedance when viewed from the RTD at the oscillation frequency.

The coupling wire 108 is arranged between the upper conductor 107 and the resonance unit 302 in FIG. 4. This is done to transmit the signal 2 oscillated by the oscillation unit 104 to the active antenna 103. The coupling wire 108 is formed by a pattern on the semiconductor substrate 102. This can make the line width, thickness, and line length of the coupling wire 108 constant, thereby preventing a loss of the signal caused by a change in impedance. FIG. 5A shows the cross section of the portion of the coupling wire 108. A connection portion 108*a* of the coupling wire 108 with the resonance unit 302 and a connection portion 108*b* with the upper conductor 107 are not physically connected but electrically connected. This is because connection is performed by capacitive coupling. Since the high-frequency component of the signal 2 to be transmitted need only be transmitted and the first bias control unit 105 and the second bias control unit 106 may have different bias voltages, electrical connection may be performed to pass only an AC (alternate current) component without passing a DC (direct current) component. When controlling the bias in the same manner, direct connection may be performed, and it may be set to connect only one of the connection portions 108*a* and 108*b* by capacitive coupling, and to provide a capacitive coupling portion at a midpoint of the coupling wire 108.

Referring to FIGS. 5A to 5C, it is possible to ensure the insulation property between the antenna and the resonance unit and adjust the dielectric constant around the antenna and resonance unit by arranging an insulator and dielectric layer 312 around the negative-resistance elements 300 and 301, the upper conductor 107, the resonance unit 302, and the coupling wire 108. Since the dielectric constant is associated with the wavelength of the high-frequency signal passing through the microstrip line such as the antenna and the resonance unit, the dielectric constant is an important parameter. A passivation layer 313 for device protection is provided in the upper portion of the device.

An equivalent circuit simulating the arrangement of this embodiment will be described next with reference to FIG. 6. In the circuit diagram, the second bias control unit 106, the oscillation unit 104, the coupling wire 108, the active antenna 103, and the first bias control unit 105 are connected in this order from the left side. The coupling wire 108 has, as distributed constants, capacitances $C_1$ and $C_2$, resistances $R_1$ and $R_2$, and inductances $L_1$ and $L_2$ of the line that connect the bias potential and GND. Reference symbols $C_3$ and $C_4$ denote a capacitive coupling component between the active antenna 103 and the coupling wire 108 and a capacitive coupling component between the oscillation unit 104 and the coupling wire 108, respectively. $Z_1$, $Z_2$, and $Z_3$ described in the circuit diagram represent impedance components intrinsic to the upper conductor 107, the resonance unit 302, and the coupling wire 108, respectively.

The upper conductor 107 and the first negative-resistance element 300 connect, via respective elements, GND and a first bias potential 502 biased by a voltage V1 by the first bias control unit 105. The upper conductor 107 connects the first bias potential 502 and GND, and the first negative-resistance element 300 connects the first bias potential 502 and GND. The voltage V1 is a potential that operates in the first region 201 or the third region 203 where the first negative-resistance element 300 generates a positive resistance. The resonance unit 302 and the second negative-resistance element 301 are supplied with a second bias potential 503 of a voltage V2 by the second bias control unit 106, and are connected via an equivalent circuit element between the second bias potential 503 and GND. The voltage V2 is a potential that operates in the second region 202 where the second negative-resistance element 301 generates a negative resistance. The second bias potential 503 includes the signal 2 generated by oscillation of the oscillation unit 104, and the resonance unit 302 is set so that the frequency $f_2$ at which the oscillation unit 104 oscillates becomes a resonance frequency. The coupling wire 108 is set to an impedance that transmits the signal 2, and supplies power of the first bias potential 502 to the active antenna 103 to excite the active antenna 103, thereby generating the signal 3. Each GND may be supplied by any method, for example, supplied from a common terminal via a common conductor, supplied from a different terminal via an individual conductor, or may be supplied from a common terminal by branching into individual conductors.

The upper conductor 107 oscillates by receiving the terahertz wave 101 as the signal 1 (Si) from the outside. Since the first negative-resistance element 300 is connected to the first bias potential, a mixing operation of the signals 1 and 3 is performed based on nonlinearity to generate the signal 4. The signal 4 is transmitted to the detection circuit 110 via a detection signal extraction means such as a bias T 501. In the bias T, when only an AC component of the first bias potential 502 is transmitted by $C_5$, the first bias potential 502 and the signal 4 are separated, thereby performing subsequent detection. This embodiment assumes that the bias voltage is generated from the bias control unit. However, a passive circuit and a switch for adjusting the bias voltage can be provided on the semiconductor substrate 102 to convert the bias voltage from the bias control unit 105 or 106 or perform ON/OFF control. Although the bias T 501 is provided as a detection signal extraction means, only the capacitive coupling component of the bias T 501 can be arranged on the semiconductor substrate 102 and connected to a detection circuit outside the semiconductor substrate 102. Furthermore, a wiring in the semiconductor may be substituted by setting the inductance $L_3$ as an inductance component of the wiring, and the arrangement of the signal extraction means is not limited to this.

Figure 6:
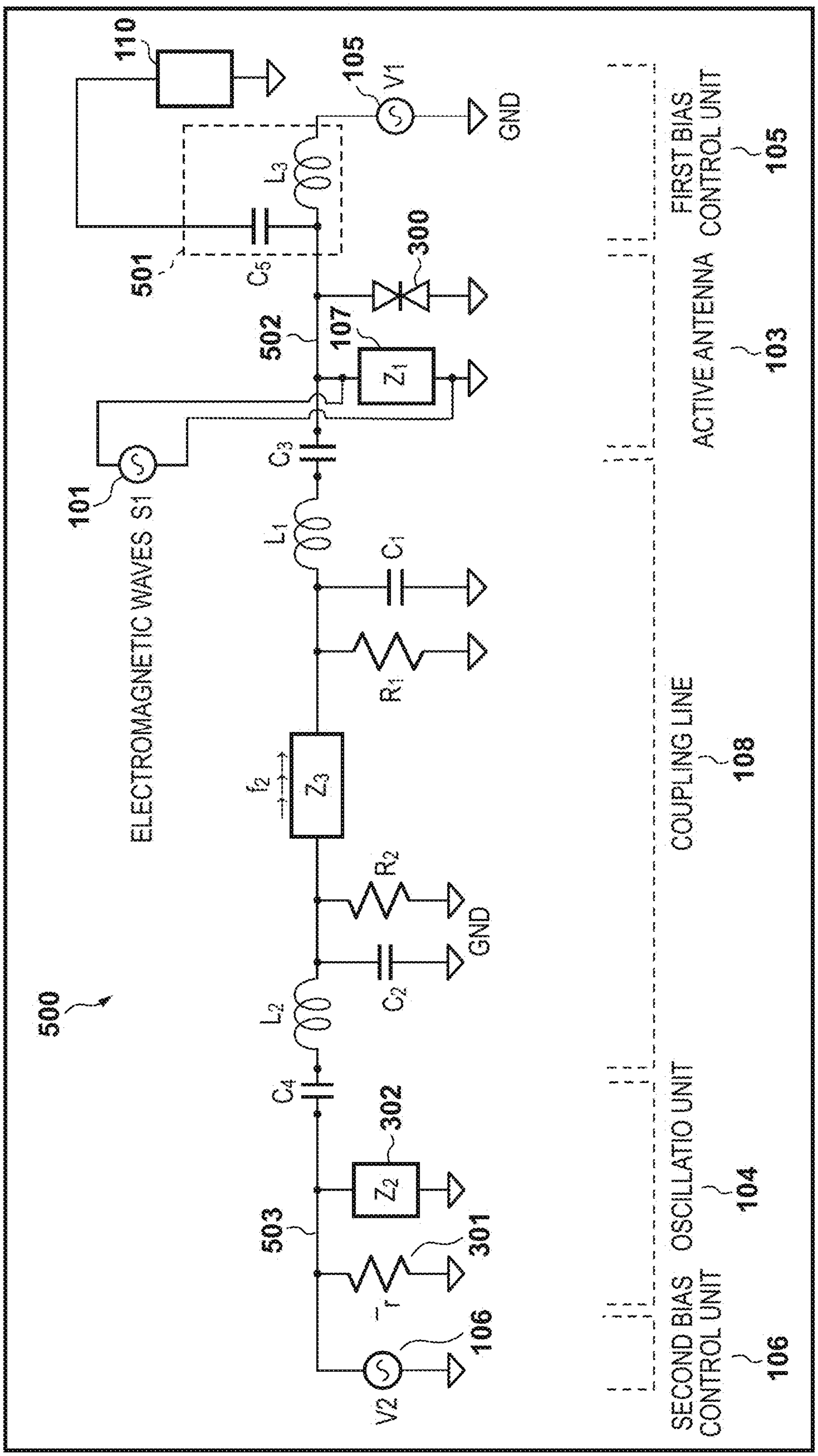
FIG. 6 is a circuit diagram showing an equivalent circuit of the semiconductor substrate according to the first embodiment.
Figure 7:
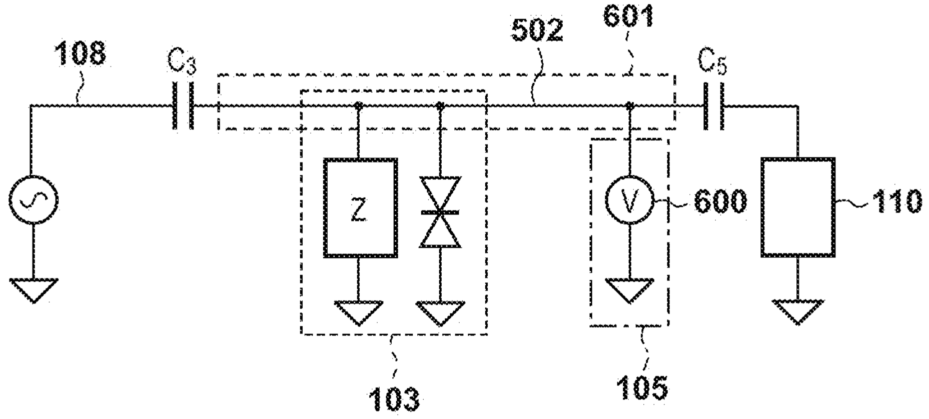
FIG. 7 is a circuit diagram obtained by simplifying the equivalent circuit shown in FIG. 6.

FIG. 7 shows a circuit obtained by simplifying the equivalent circuit shown in FIG. 6 by focusing on the active antenna 103. A bias signal of a bias voltage 600 of the first bias control unit 105 is supplied to the upper conductor 107 and the first negative-resistance element 300 on the active antenna, and is connected via a first bias path 601 of the first bias potential 502. The coupling wire 108 including the capacitive coupling portion $C_3$ and the detection signal extraction means including $C_5$ are connected to the first bias path 601. $C_3$ and $C_5$ function as high-pass filters (HPFs) that block DC components and transmit AC components. Since the signal 2 flowing through the coupling wire 108 has a high frequency, $C_3$ has a high cutoff frequency, and $C_5$ has a low cutoff frequency to transmit a down-converted frequency component of the signal 4. Therefore, the electrostatic capacitance of $C_5$ is set larger than that of $C_4$. If a low-cutoff frequency circuit is connected to $C_3$, the signal 4 of the active antenna 103 is transmitted through the coupling wire 108 to increase a loss of a detection signal.

According to this embodiment, it is possible to construct a reception apparatus as a single apparatus. In the conventional arrangement, the oscillation unit 104 on the same substrate generates an oscillation signal in the terahertz band that is difficult to be handled, and the signal can be transmitted to the active antenna 103 with less loss. In the mixing operation, by changing the frequency $f_2$ of the oscillation unit 104, it is possible to construct not only a homodyne device but also a heterodyne device, and to change a synchronized phase by adjustment of the coupling wire 108. By arranging these signal processing units having frequencies in the terahertz band on the one semiconductor substrate 102, it is possible to manufacture the reception apparatus using the highly accurate semiconductor manufacturing technique. Since the high-frequency signal 2 can be used as a synchronous signal, the frequency of the signal 4 to be handled becomes low in a signal processing circuit outside the semiconductor substrate, and an apparatus similar to the conventional signal processing circuit can detect a terahertz wave.

According to this embodiment, it is possible to execute the mixing operation by changing the bias signal to be supplied to the antenna apparatus formed on the same substrate. Unlike PTL 1 assuming homodyne detection, it is possible to provide a function as an orthogonal mixer that obtains amplitude and phase information by changing a phase as a local oscillation signal to the mixer since the mixer and the resonance unit are implemented by the same element.

Second Embodiment

Figure 8:
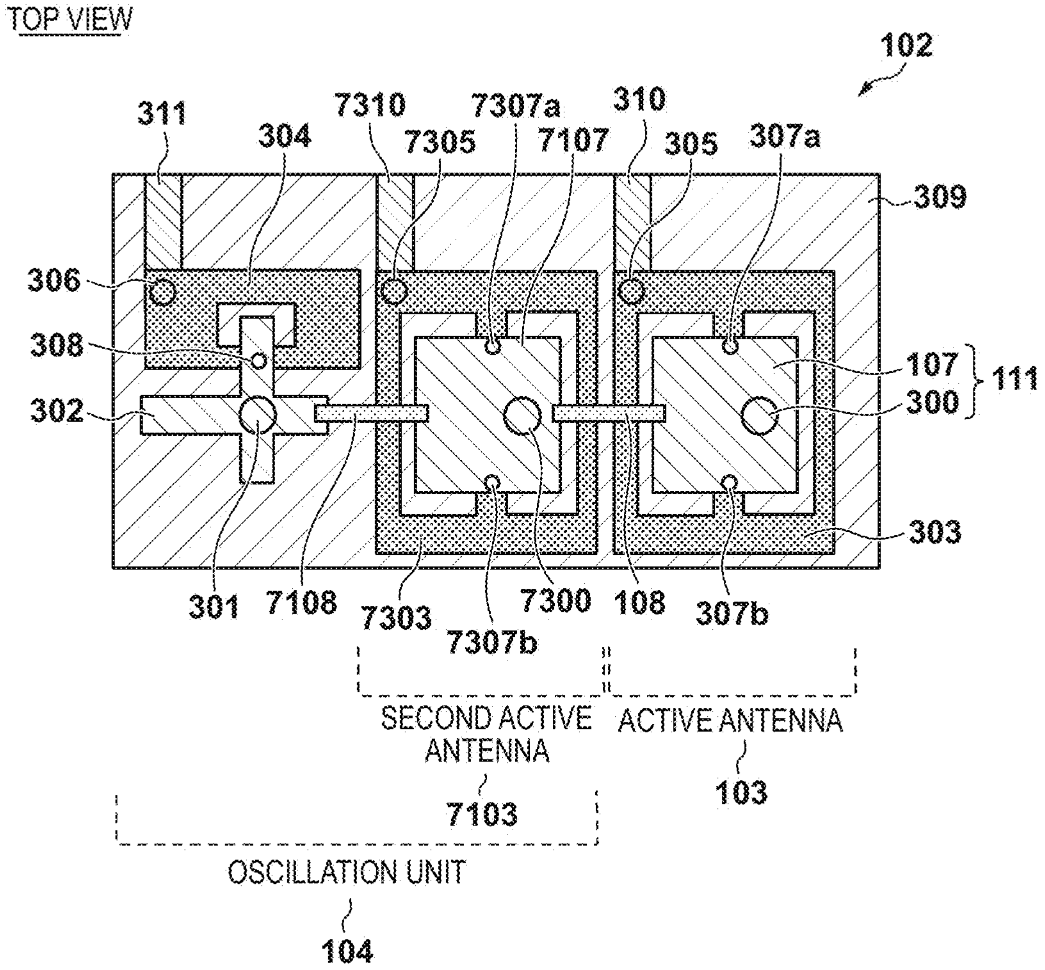
FIG. 8 is a schematic plan view of a semiconductor substrate according to the second embodiment.

The second embodiment will describe an arrangement of cascade-connecting a plurality of active antennas of the first embodiment. In this embodiment, it is possible to configure an active antenna 103 and an oscillation unit 104, as shown in FIG. 8. Among left, right, and central element structures in FIG. 8, the right and left element structures are the same as those in FIG. 4 described in the first embodiment. The central element structure indicates a second active antenna 7103 obtained by additionally arranging the right active antenna 103. A rectangular portion located at the center of the second active antenna 7103 indicates a second upper conductor 7107. A structure including a third negative-resistance element 7300 is provided near the center of the second upper conductor 7107, and the stacked structure of a Resonant Tunneling Diode (RTD) and a wiring for electrical connection are formed in this portion. Furthermore, feeding vias 7307*a* and 7307*b* are arranged on the upper and lower sides of the second upper conductor 7107 in FIG. 8, and a feeding path for applying a bias voltage to the third negative-resistance element 7300 is formed.

The bias voltage is supplied, to a third bias wiring 7310, from a bias control unit outside the semiconductor substrate 102. The third bias wiring 7310 connects a third bias conductive layer 7303 by a third bias via 7305, and is connected from the third bias conductive layer 7303 to the feeding vias 7307*a* and 7307*b*. As the bias control unit, the same first bias control unit 105 as that of the right active antenna 103 or a different bias control unit may be provided. A signal oscillated by the resonance unit 302 excites the second active antenna 7103 via a second coupling wire 7108, and also excites the active antenna 103 via a coupling wire 108. When viewed from the active antenna 103, the two central and left element structures are considered as the oscillation unit 104. Furthermore, in this embodiment, the arrangement in which connection is performed via one active antenna has been explained. However, connection may be performed via a plurality of active antennas and the number of cascade-connected active antennas is not limited to this.

As described above, according to this embodiment, it is possible to efficiently supply an oscillation signal to the plurality of active antennas 7103 and 103. It is necessary to perform impedance control of the coupling wire 108 and the second coupling wire 7108 to suppress loss. Furthermore, since the oscillation unit 104 can supply an oscillation signal to another active antenna via one active antenna, it is possible to improve the degree of freedom of the design of the semiconductor substrate 102 on which the plurality of active antennas 7103 and 103 are arranged.

Third Embodiment

The third embodiment will describe an embodiment in which an active antenna 103 performs self-oscillation. Note that a description of the same components and functions as in the first and second embodiments will be omitted and points different from the first and second embodiments will be described in detail.

Figure 9:
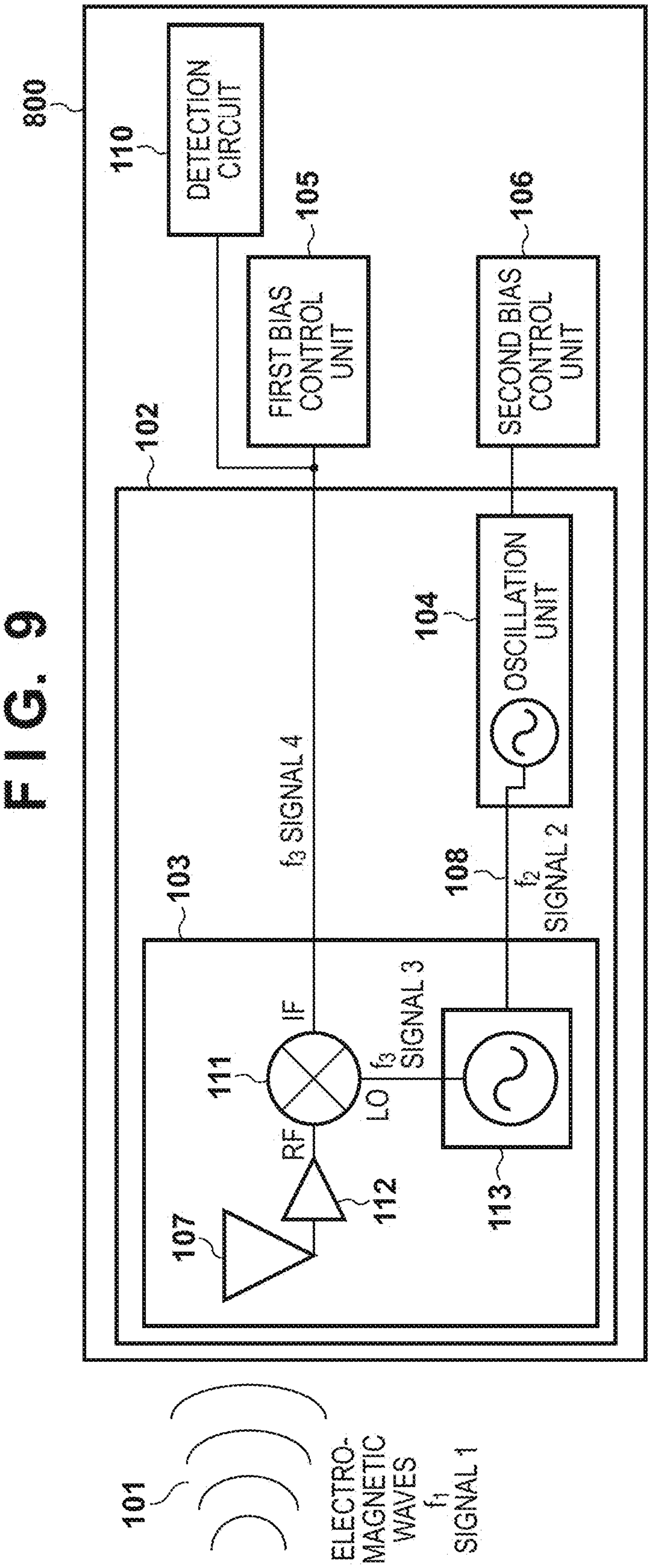
FIG. 9 is a block diagram showing an antenna apparatus according to the third embodiment.

FIG. 9 is a functional block diagram of an antenna apparatus 800 according to this embodiment. The antenna apparatus 800 according to this embodiment includes, in the active antenna 103, an excitation unit 113 in an oscillation state, as compared with each of the first and second embodiments. When a first bias control unit 105 applies a bias voltage that generates a negative resistance in a negative-resistance element of the active antenna 103, a resonance structure and the negative-resistance element in the active antenna 103 serve as an oscillator to excite a natural frequency (self-oscillation). In addition, injection locking is performed by inputting a signal 2 by a coupling wire 108.

Injection locking is a phenomenon in which when a synchronous signal (in this case, the signal 2) is injected, from the outside, into the oscillation unit that performs self-oscillation, the oscillation frequency of the internal oscillator that performs self-oscillation is synchronized with the frequency of the external signal. In this embodiment, the active antenna 103 serves as a self-excited oscillator to perform injection locking by the signal 2. In addition, since the voltage of the first bias control unit 105 generates a negative resistance in the first negative-resistance element, the first negative-resistance element applies a voltage that operates in a second region 202 shown in FIG. 2, unlike the first and second embodiments. Since the active antenna 103 can amplify the signal by oscillation of the negative-resistance element and the resonance structure of the active antenna 103, it serves as a reception apparatus including an amplifier 112, an oscillator, and a mixer 111. These detection operations are generally called coherent detection, and it is known that the active antenna 103 amplifies injection-locked frequency components. In a homodyne detector applied with this embodiment, the active antenna 103 can perform synchronous oscillation at a frequency $f_1$ by being injection-locked with a received terahertz wave 101. Thus, the frequency $f_1$ of a signal 1 and a frequency $f_3$ of a signal 3 are synchronized with each other, thereby obtaining $f_1=f_3$. Since the strength of the signal 3 is increased by injection locking, it is possible to efficiently perform mixing.

A condition for causing injection locking is given by expression (2) obtained by deforming a condition given by expression (1) for obtaining the locking range of injection locking known as injection locking of the RTD, and it is thus understood that the condition is associated with an injection signal strength $P_{inj}$.

$$|\Delta f| \leq (f_{OSC}/Q)\times(P_{inj}/P_{OSC})^{1/2} \quad (1)$$

$$|\Delta f|\times(Q/f_{OSC}))^2\times P_{OSC} \leq P_{inj} \quad (2)$$

where |Δf| represents the absolute value of the difference between the oscillation frequency of the oscillator that performs self-oscillation and the frequency of an injection locking signal, Q represents the Q value of the resonator, $f_{OSC}$ represents the oscillation frequency of the oscillator, $P_{OSC}$ represents the oscillation strength of the oscillator, and $P_{inj}$ represents the injection strength of the injection locking signal. It is understood that in a case where $P_{inj}$ is equal to or higher than the left-hand side of expression (2), injection locking occurs. $P_{inj}$, Δf, and $f_{OSC}$ are decided based on the strength and frequency of the signal 2 in a case of injection locking by the signal 2, and also depend on the strength and frequency of the signal 1 in a case of injection locking by the signal 1 of the received terahertz wave 101. In injection locking, it is possible to control occurrence of injection locking by appropriately controlling a second bias control unit 106 and the signal 1 of the terahertz wave 101 by using the strengths and frequencies as thresholds.

Note that the bias voltage applied from the first bias control unit 105 may have a value around the boundary between a first region 201 and the second region 202 in FIG. 2. In this case, an amplitude changing around regions where a positive resistance and a negative resistance are generated when a variation of a current or voltage occurs by the signal is obtained. In this state, all the frequency components of the input signal can be amplified, and detection can be performed while maintaining a high modulation depth. This detection method is called amplification detection. It can be expected to improve signal quality by any detection method, and it is possible to detect a terahertz wave in a detection circuit.

Similar to the second embodiment, in this embodiment as well, it is possible to cascade-connect the plurality of active antennas 103.

An equivalent circuit according to this embodiment will be described with reference to FIG. 6. In the active antenna 103, an upper conductor 107 and a first negative-resistance element 300 are biased by the first bias control unit 105 by a first bias potential 502 of a voltage V1, and the first bias potential 502 and GND are connected via an equivalent circuit element. Unlike the first and second embodiments, the voltage V1 has a potential in the second region 202 where a negative resistance of the first negative-resistance element 300 is generated. Similar to the above-described embodiments, in an oscillation unit 104, a second negative-resistance element 301 is biased by the second bias control unit 106 by a second bias potential 503 of a voltage V2, and the second bias potential 503 and GND are connected via an equivalent circuit element. Similar to the first and second embodiments, the second negative-resistance element 301 has a potential in the second region 202 where a negative resistance is generated.

The first negative-resistance element 300 performs self-oscillation together with the resonance structure in the active antenna 103 by generating a negative resistance. The resonance structure is a portion including the upper conductor 107 and having undergone impedance control, and is configured so that a self-oscillation frequency becomes a resonance frequency. Furthermore, the active antenna 103 is injection-locked by using, as an injection signal, the signal 2 input via the coupling wire 108, and is synchronized at the same frequency as that of the signal 2, thereby generating the signal 3 of $f_2=f_3$. The active antenna 103 generates a signal 4 as a detection signal by mixing the signal 3 and the signal 1 obtained by entrance of an electromagnetic wave. Since $f_2=f_3$ is obtained by injection locking by the signal 2, if the frequency $f_3$ of the signal 3, that is, the frequency $f_2$ of the signal 2 is the same as the frequency $f_1$ of the signal 1, homodyne detection can be performed, and if the frequencies are different from each other, heterodyne detection can be performed. If a condition for causing injection locking by the signal 1 can be satisfied, the frequency $f_1$ of the signal 1 is equal to the frequency $f_3$ of the signal 3 ($f_1=f_3$), and thus the active antenna can operate as a homodyne detector in this case as well. In other words, if the active antenna is operated as a heterodyne detector, the antenna apparatus 800 controls a bias signal output from each of the bias control units 105 and 106 so as not to cause injection locking by the signal 1.

In general, it is possible to obtain a high-quality IF signal by inputting, for mixing, a high-strength LO (Local Oscillator) signal with less phase noise in addition to an RF signal. In this embodiment, in addition to the advantages in the above-described embodiments, it is possible to obtain the high-strength signal 3 since the power of the signal 3 generated by injection locking is added to the power of the signal 2. In addition, by using the oscillation unit 104 with less phase noise, it is also possible to reduce phase noise of the signal 3 generated by injection locking, and it can be expected to improve the quality of an output signal. By improving signal quality by amplification detection and coherent detection, it is possible to attempt to reduce a bit error rate (BER) of wireless communication by a detection signal with less noise with respect to a high-speed modulation signal. Furthermore, even in a case where the plurality of active antennas are cascade-connected, each active antenna 103 performs self-oscillation, and thus a synchronous signal hardly attenuates by the coupling line. This arrangement is advantageous when the number of cascade-connected active antennas increases.

Example 1

An example for implementing the third embodiment will be described with reference to FIGS. 4 and 5A to 5C. The shapes, dimensions, and manufacturing method according to this example are merely examples, and the present invention is not limited to them. An active antenna 103 shown in FIG. 4 is a semiconductor device that can receive signals in a frequency band of 0.45 to 0.5 THz, and the active antenna 103 and an oscillation unit 104 are semiconductor devices that can perform single-mode oscillation in the same frequency band. A semiconductor substrate 102 is a semi-insulating InP substrate. A semiconductor layer 3002 or 3012 and an RTD 3003 or 3013 are formed from a multi-quantum well structure by InGaAs/AlAs lattice-matched on the semiconductor substrate 102, and an RTD having a dual barrier structure is used in this example. This is also called the semiconductor heterostructure of the RTD. As the current-voltage characteristic of the RTD used in this example, for example, the peak current density is 9 mA/μm$^2$, and the negative differential conductance per unit area is 10 mS/μm$^2$. The semiconductor layer 3002 or 3012 and the RTD 3003 or 3013 are formed in a mesa structure, and are formed from a semiconductor structure including the RTD, and an ohmic electrode for electrical connection to the semiconductor structure. The mesa structure has a circular shape with a diameter of 2 μm, and the magnitude of the negative differential resistance of the RTD at this time is about −30Ω per diode. In this case, it is estimated that the negative differential conductance (GRTD) of a negative-resistance element 300 or 301 including the RTD is about 30 mS and the diode capacity (CRTD) is about 10 fF.

The active antenna 103 is set to operate as a resonator whose width is $\lambda_{THz}/2$ by setting the A-A' direction of an upper conductor 107 as a resonant direction. $\lambda_{THz}$ represents an effective wavelength, in an insulator and dielectric layer 312, of a terahertz wave that resonates in the active antenna 103. When λ0 represents the wavelength of the terahertz wave in a vacuum, and $F_r$ represents the effective relative permittivity of the insulator and dielectric layer 312, $\lambda_{THz}=\lambda 0\times\varepsilon_r^{-1/2}$ is obtained. The active antenna 103 according to this example is a square patch antenna in which one side of the upper conductor 107 is 150 μm, and the resonator length (L) of the antenna is 150 μm. The line length of the oscillation unit 104 is 150 μm in the A-A' direction and 150 μm in a direction orthogonal to the A-A' direction, the intersection point of vertical and horizontal strip lines is set as a position at which an input impedance to the strip line is adjusted, and the second negative-resistance element 301 is arranged at the position. That is, the oscillation unit 104 includes a microstrip-line resonator formed by microstrip lines.

The upper conductor 107 and a resonance unit 302 are formed by a metal layer (a metal containing Ti/Au) mainly including an Au thin film with a low resistivity. A GND layer 309 as a ground conductor is formed by a Ti/Au layer and a semiconductor layer including an n+-InGaAs layer whose electron concentration is $1\times10^{18}$ $cm^{-3}$ or more, and the metal layer and the semiconductor layer are connected with low-resistance ohmic contact. The upper portion of the insulator and dielectric layer 312 is made of BCB (benzocyclobutene). The lower portion of the insulator and dielectric layer 312 is formed by $SiO_2$ of two layers.

The RTD 3003 as the semiconductor layer is arranged at a position shifted from the center of gravity of the upper conductor 107 by 40% (60 m) of one side of the upper conductor 107 in the resonance direction (A-A' direction). The input impedance when supplying a high frequency from the RTD to the patch antenna is decided based on the position of the RTD in the antenna. Each of bias conductive layers 303 and 304 is formed by a metal layer containing Ti/Au stacked in the insulator and dielectric layer 312. The active antenna 103 and the oscillation unit 104 are designed to obtain oscillation with power of 0.2 mW at the frequency $f_{THz}$=0.5 THz by setting a bias in the negative-resistance region of the RTD included in each of the negative-resistance elements 300 and 301.

The frequency $f_{THz}$ of the terahertz wave oscillated from the active antenna 103 and the oscillation unit 104 is decided based on the resonance frequency of a fully-parallel resonant circuit obtained by combining the patch antenna, the resonance unit, and the reactance of the negative-resistance element 300 or 301. More specifically, with respect to a resonant circuit obtained by combining the admittances ($Y_{RTD}$ and $Y_{11}$) of an RTD and an antenna from the equivalent circuit of the oscillator described in NPL 1, a frequency satisfying an amplitude condition given by expression (3) and a phase condition given by equation (4) is decided as the oscillation frequency $f_{THz}$.

$$\mathrm{Re}[Y_{RTD}]+\mathrm{Re}[Y_{11}]\leq 0 \tag{3}$$

$$\mathrm{Im}[Y_{RTD}]+\mathrm{Im}[Y_{11}]=0 \tag{4}$$

where $Y_{RTD}$ represents the admittance of the negative-resistance element 300 or 301, Re represents a real part, and Im represents an imaginary part. Since the first negative-resistance element 300 has a negative resistance, $\mathrm{Re}[Y_{RTD}]$ has a negative value. $Y_{11}$ represents the admittance of the whole structure of the active antenna 103 and the resonance unit 302 when viewed from the negative-resistance element 300 or 301.

In the insulator and dielectric layer 312, the periphery of the GND layer 309 and the RTD 3003 or 3013 is required to have an insulation property (the property of behaving as an insulator or high resistance body that does not conduct electricity with respect to a DC voltage), a barrier property (the property of preventing spread of a metal material used for an electrode), and processability (the property of requiring processing with sub-micron accuracy). As a practical example of a material satisfying these properties, an inorganic insulator material such as silicon oxide ($\varepsilon_{r2}$=4), silicon nitride ($\varepsilon_{r2}$=7), aluminum oxide, or aluminum nitride is used. $\varepsilon_{r2}$ represents the relative permittivity of the material of the insulator and dielectric layer 312.

The width of a via 3001 is preferably set so as not to interfere with a resonance electric field, and is typically set to 1/10 or less of the effective wavelength k of the standing terahertz wave of the oscillation frequency $f_{THz}$ in the active antenna 103. The width of the via 3001 may be small to the extent that series resistance is not increased, and can be reduced to about twice a skin depth as a guide. Considering that the series resistance is decreased to a value not exceeding 1Ω, the width of the antenna-element via 3001 typically has a columnar structure having a diameter falling within the range of 0.1 μm (inclusive) to 20 μm (inclusive), in an example, a diameter of 10 μm.

Each of feeding vias 307*a* and 307*b* is a connection portion for electrically and physically connecting the first bias conductive layer 303 to the upper conductor 107. A structure that electrically connects the upper and lower layers is called a via. In addition to the role as a member forming the patch antenna, the upper conductor 107 serves as an electrode for injecting a current into the first negative-resistance element 300 by being connected to these vias. As vias 3001, 3011, 307, 308, 305, and 306 used in this example, a material having a resistivity of $1\times10^{-6}$ Ω·m or less can be used. More specifically, as the material, a metal or a metal compound such as Ag, Au, Cu, W, Ni, Cr, Ti, Al, AuIn alloy, or TiN is used.

Bias wirings 310 and 311 are bias wirings of the active antenna 103 and the oscillation unit 104. Each of the bias control units 105 and 106 is a power supply arranged outside the semiconductor substrate 102 to supply a bias signal to the negative-resistance element 300 or 301 of each antenna. Each of the bias control units 105 and 106 includes a stabilization circuit for suppressing a parasitic oscillation of a low frequency. The stabilization circuit is set to have an impedance lower than the absolute value of the negative resistance corresponding to the gain of the negative-resistance element 300 or 301 in a frequency band from DC to 10 GHz.

The active antenna 103 and the oscillation unit 104 are connected to the coupling wire 108, thereby transmitting the signal 2 of the oscillation unit 104 to the active antenna 103 in a terahertz frequency band. The end portion of the coupling wire 108 overlaps the upper conductor 107 or the resonance unit 302 by only 5 μm by sandwiching the insulator and dielectric layer 312, thereby forming a capacitor structure. The coupling wire 108 is designed to be a λ/2 line. In this case, λ represents the effective wavelength of the line at the oscillation frequency $f_2$ of the oscillation unit 104. When connecting the coupling wire 108 to the active antenna 103 and the oscillation unit 104, the length of the coupling wire 108 is designed to satisfy a phase matching condition in one or both of the magnetic field direction (H direction) and the electric field direction (E direction).

(Manufacturing Method)

A manufacturing method of the semiconductor substrate 102 will be described next.

(1) First, on the semiconductor substrate 102 made of InP, an InGaAs/AiAs-based semiconductor multilayer film structure forming the semiconductor layers 3002 and 3012 including the RTDs 3003 and 3013 is formed by epitaxial growth.

(2) The ohmic electrode Ti/Au layer forming the semiconductor layers 3002 and 3012 is deposited by sputtering.

(3) semiconductor layer 3002 and 3012 comprising the RTD 3003 and 3013 are formed in a mesa structure having a circular shape with a diameter of 2 m. To form the mesa shape, photolithography and dry etching are used.

(4) After the GND layer 309 is formed on the semiconductor substrate 102, silicon oxide is deposited on the etched surface by a lift-off process to obtain the lower insulator and dielectric layer 312. A Ti/Au layer is formed as a conductor forming the bias wirings 310 and 311 on the insulator and dielectric layer 312.

(5) Silicon oxide is deposited to obtain the additional insulator and dielectric layer 312.

(6) The insulator and dielectric layer 312 in portions forming the vias 305 and 306 is removed by photolithography and dry etching to form via holes. In addition, a Ti/Au layer is formed as a conductor forming the bias conductive layers 303 and 304 on the additional insulator and dielectric layer 312.

(7) BCB is embedded and planarized using spin coating and dry etching to obtain the upper insulator and dielectric layer 312.

(8) The BCB and silicon oxide in the portions forming the vias 3001 and 3011 are removed by photolithography and dry etching to form via holes (contact holes).

(9) The vias 3001 and 3011 are formed in the via holes by conductors containing Cu. To form the vias 3001 and 3011, Cu is embedded in the via holes and planarized using sputtering, electroplating, and chemical mechanical polishing.

(10) An electrode Ti/Au layer is deposited to obtain the upper conductor 107 and the resonance unit 302. The upper conductor 107 and the resonance unit 302 are patterned by photolithography and dry etching.

(11) Silicon nitride is deposited to obtain the uppermost insulator and dielectric layer 312. An electrode Ti/Au layer is deposited to obtain a conductor layer forming the coupling wire 108. The coupling wire 108 is patterned by photolithography and etching.

(12) Finally, the passivation layer 313 is formed as a protective layer, thereby completing the stacked structure of the semiconductor substrate 102.

Fourth Embodiment

Figure 10A:
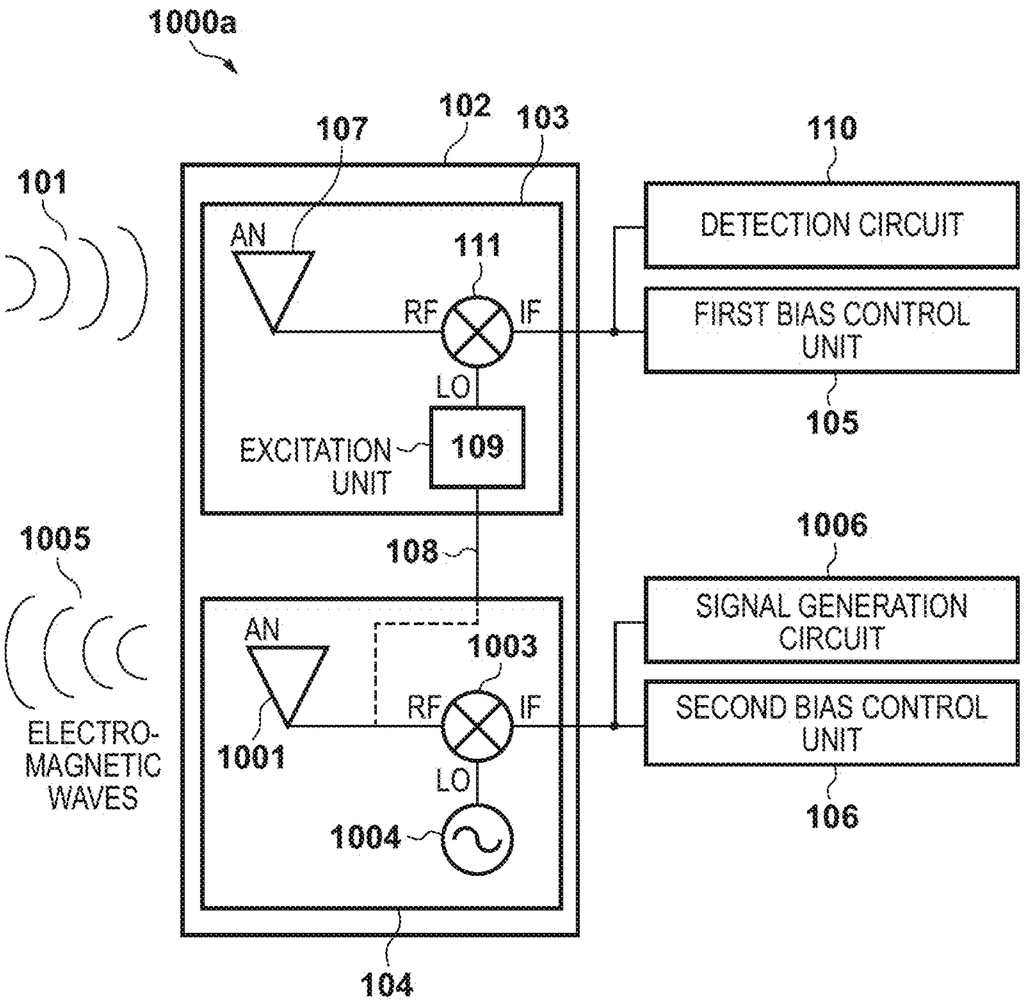
FIG. 10A is a block diagram showing an antenna apparatus according to the fourth embodiment.
Figure 10B:
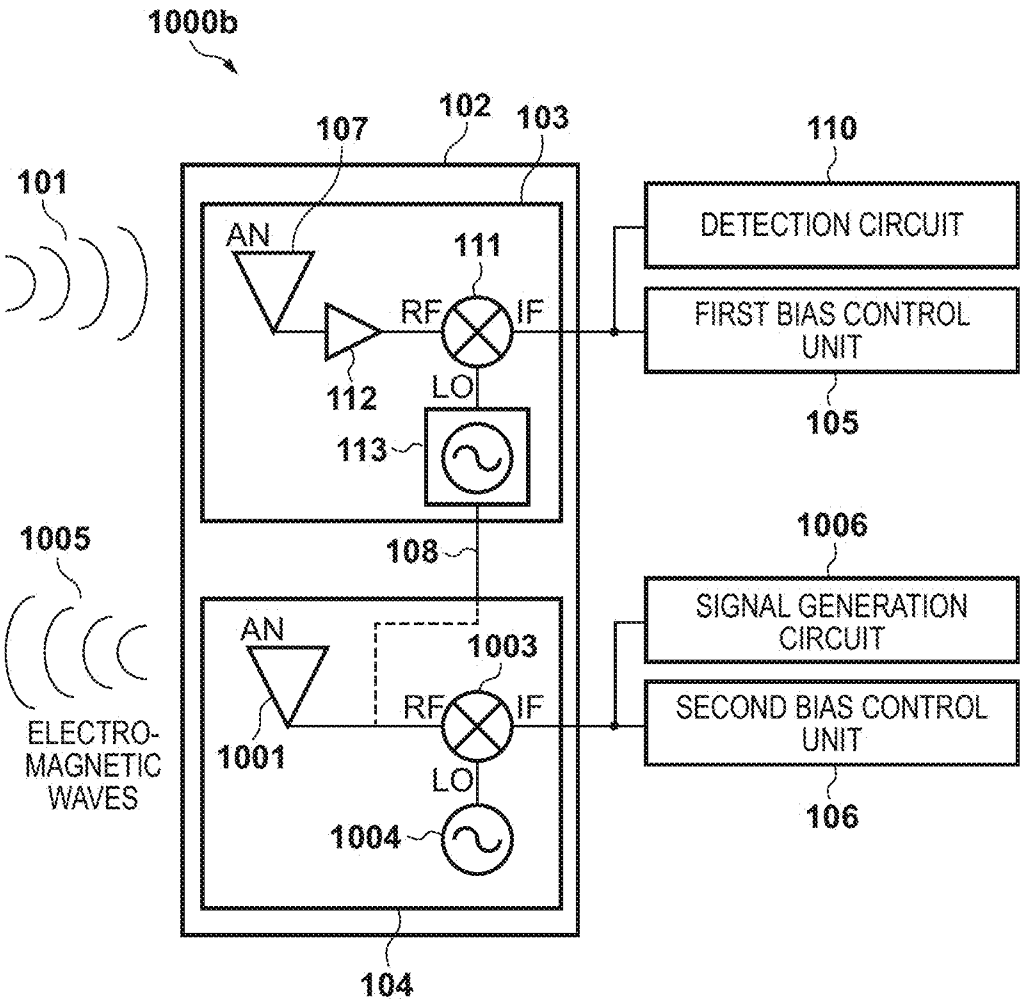
FIG. 10B is a block diagram showing the antenna apparatus according to the fourth embodiment.

The fourth embodiment will describe an embodiment in a case where an oscillation unit 104 is used as a transmission active antenna. FIGS. 10A and 10B are block diagrams according to this embodiment. FIG. 10A shows a case where an active antenna 103 performs an operation as in each of the first and second embodiments. FIG. 10B shows a case where the active antenna 103 performs an operation as in the third embodiment. FIGS. 10A and 10B respectively show reception apparatuses 1000*a* and 1000*b* according to this embodiment. Each of the reception apparatuses 1000*a* and 1000*b* is configured to receive a terahertz wave 101 entering from the outside. In addition, each of the reception apparatuses 1000*a* and 1000*b* has a function of emitting, as a terahertz wave 1005, a signal generated in the reception apparatus to the outside. This embodiment assumes that the received terahertz wave 101 is a signal 1 having a frequency $f_1$ and the emitted terahertz wave 1005 is a signal T1 having a frequency $f_{1t}$.

Each of the reception apparatuses 1000*a* and 1000*b* includes a semiconductor substrate 102, a first bias control unit 105, a second bias control unit 106, a detection circuit 110, and a signal generation circuit 1006. The semiconductor substrate 102 is the same as in other embodiments. Similar to the above-described embodiments, the semiconductor substrate 102 includes the active antenna 103, an oscillation unit 104, and a coupling wire 108. The oscillation unit 104 includes a negative-resistance element and a resonance unit. In this embodiment, however, the oscillation unit 104 includes an antenna. Thus, the oscillation unit 104 operates as a transmission antenna. The oscillation unit 104 will sometimes be referred to as the transmission antenna 104 hereinafter and the active antenna 103 will sometimes be referred to as the reception antenna 103 hereinafter.

The transmission antenna 104 is configured to oscillate at a natural frequency $f_2$ by an element and a structure. The reception antenna 103 and the transmission antenna 104 are connected to the first bias control unit 105 and the second bias control unit 106, respectively, thereby applying a bias voltage to each negative-resistance element. A bias path for applying the bias voltage to the negative-resistance element of the reception antenna 103 from the first bias control unit 105 is set as a first bias path, and a bias path for applying the bias voltage to the negative-resistance element of the transmission antenna 104 from the second bias control unit 106 is set as a second bias path. The detection circuit 110 is connected to the first bias path and the signal generation circuit 1006 is connected to the second bias path.

The bias control unit applies, to each negative-resistance element, as the bias voltage, power input outside the reception apparatus 1000*a* or 1000*b*. Furthermore, to prevent a parasitic oscillation in each resonance structure, each of the first and second bias paths may include a filter circuit using a shunt resistor and a capacitor, and a switch that turns on/off the power.

Each bias control unit is continuously or intermittently controlled to a predetermined bias voltage. The first bias control unit applies a voltage that generates a positive resistance in the negative-resistance element of the reception antenna 103 in the case shown in FIG. 10A, and applies a voltage that generates a negative resistance in the case shown in FIG. 10B. The coupling wire 108 is a signal line that electrically connects the reception antenna 103 and the transmission antenna 104, and is patterned on the semiconductor substrate 102. The second bias control unit 106 applies the bias voltage that generates a negative resistance in the negative-resistance element to oscillate the transmission antenna 104.

FIGS. 10A and 10B each show an oscillation by the negative-resistance element of the transmission antenna 104 as an oscillator 1004 from a functional perspective. A signal 2 generated by the oscillator 1004 is transmitted to the reception antenna 103 through the coupling wire 108. The reception antenna 103 is excited by the signal 2 to generate a signal 3 having a frequency $f_3$ in the reception antenna 103. In FIGS. 10A and 10B, the operations of excitation units 109 and 113 are different from each other. In the case shown in FIG. 10A, the excitation unit 109 excites the reception active antenna by the signal 2 to generate the signal 3 of $f_2=f_3$. In FIG. 10B, the excitation unit 113 is applied by the first bias control unit 105 with the bias voltage that generates a negative resistance in the negative-resistance element of the reception antenna 103. Therefore, the negative-resistance element in the reception active antenna and the resonance structure in the reception antenna 103 serve as an oscillator to excite a natural frequency (self-oscillation). In addition, injection locking is performed by inputting the signal 2 by the coupling wire 108, thereby generating the signal 3 of $f_2=f_3$.

In FIG. 10B, the reception antenna 103 of the reception apparatus 1000*b* can amplify a signal propagated to the reception antenna 103 by the oscillation of the negative-resistance element and the resonance structure of the active antenna 103. Therefore, the reception antenna 103 can operate as a reception apparatus including the amplifier 112, the synchronous oscillation, and the mixer 111. The signal generation circuit 1006 generates a baseband signal as a signal component to be superimposed, together with a carrier wave, on the terahertz wave 1005 to be transmitted. The signal generation circuit 1006 supplies the baseband signal to the transmission antenna 104 via the second bias path. The connection portion of the signal generation circuit 1006 and the second bias path is connected using a circuit such as a bias T. A circuit arrangement using capacitive coupling or the like may be adopted to combine an AC component of the baseband signal with a DC component of the bias voltage.

Since the negative-resistance element in the transmission antenna 104 has nonlinearity, it operates as a mixer that mixes the baseband signal and the signal 2 by self-oscillation, and up-converts the baseband signal. FIGS. 10A and 10B each show a transmission mixer 1003 from a functional perspective. More specifically, by superimposing $f_2$ of the signal 2 by self-oscillation as a carrier wave and the baseband signal as a modulated wave, a signal 1T as a modulated signal in the terahertz band is generated. Since the impedance of the signal 1T is matched between the transmission antenna 104 and an external space, the signal 1T is emitted to the space. Thus, the transmission antenna 104 functions as an antenna.

The signal 2 or 1T generated in the transmission antenna 104 is propagated to the reception antenna 103 via the coupling wire 108. At this time, an electromagnetic wave having a plurality of frequency components generated in the resonance structure of the transmission antenna 104 is propagated to the reception antenna 103 via the coupling wire 108. In this embodiment, since a transmission signal input from the signal generation circuit 1006 also exists in the transmission antenna 104, the electromagnetic wave propagated in the space or through the coupling wire 108 can influence the reception active antenna on the reception antenna 103. In this case, the electromagnetic wave corresponding to the baseband signal included in the received signal 1 and the electromagnetic wave corresponding to the baseband signal included in the transmitted signal 1T may be crossed (crosstalk may occur). In this case, this may interfere with detection of the signal 1 in the detection circuit 110. However, by designing the setting of the electrical length of the coupling wire 108 and the impedance of the line based on the reference frequency of the signal 2, it is possible to reduce the influence of an unnecessary signal propagated through the coupling wire 108.

In addition, the phase of a synchronous signal input to the reception antenna 103 via the coupling wire 108 is set to be switched to 0° or 90°. As a means for changing the phase, there is provided a method of changing the impedance of the coupling wire 108 or a propagation distance. By detecting the absolute value of the received wave by a swell signal extracted from a detection signal acquired at the switched different phase, the correct strength of the received wave can be obtained. Furthermore, based on the signal generated by the signal generation circuit 1006, the reception antenna 103 or the detection circuit 110 can perform signal processing of canceling the component. A stub, a capacitive coupling unit, or the like may be arranged on the coupling wire 108 to function as a filter circuit that acts on a target frequency component. In the space, it is possible to perform polarization conversion of a transmission/reception signal using a ¼ wavelength plate or the like for the propagation path in the terahertz wave space and to cope with separation of the transmission signal and the reception signal in the space by changing the polarization direction. Note that one of the embodiments formed from the connection arrangement of the reception active antenna and the oscillation unit using the negative-resistance element can be applied, and the arrangement of reducing transmission/reception crosstalk is not limited to this. The present invention will describe an example in which the coupling wire 108 is connected to the transmission antenna 104 in this embodiment although the coupling wire 108 need only be connected to one of the resonance structures of the transmission active antennas. The connection position is not limited to that in this embodiment.

On the other hand, the first bias path on the side of the reception antenna 103 branches and is connected to the detection circuit 110 that detects the received signal. This operates as in the above-described embodiments.

Figure 11:
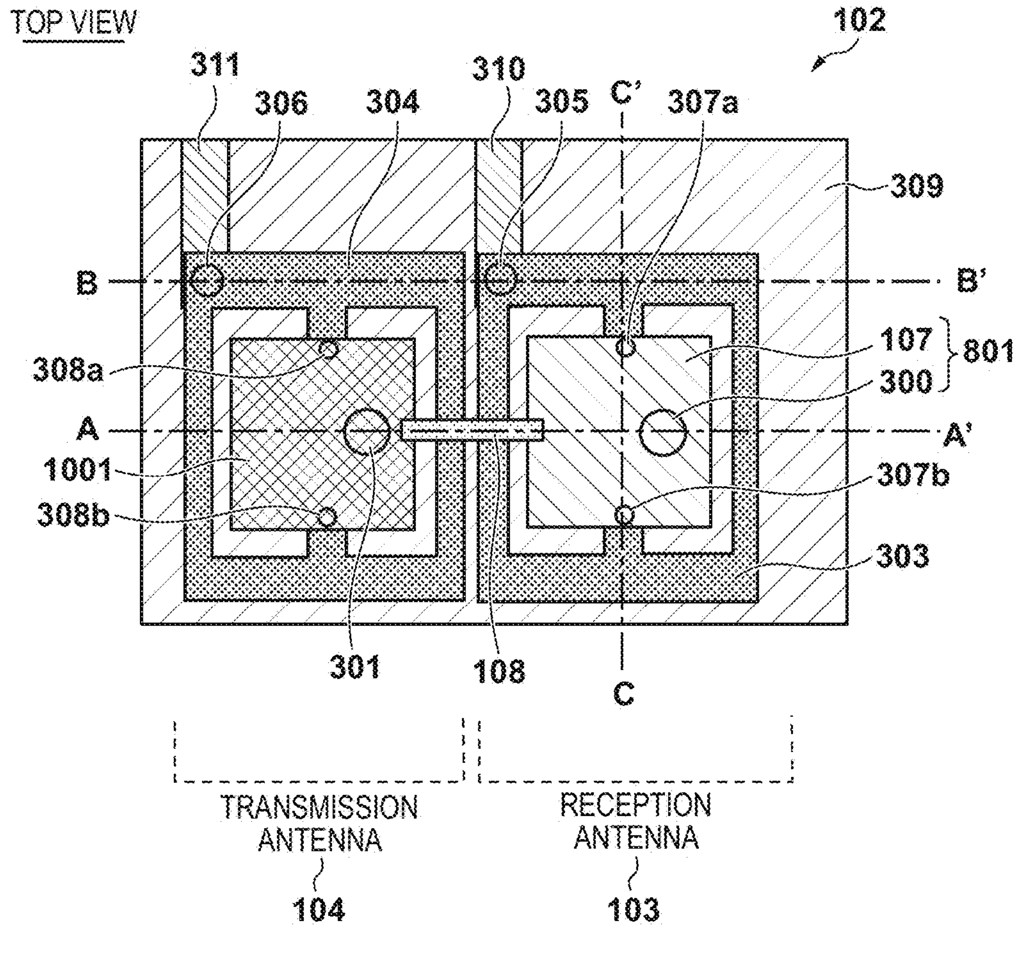
FIG. 11 is a schematic plan view of a semiconductor substrate according to the fourth embodiment.
Figure 12A:
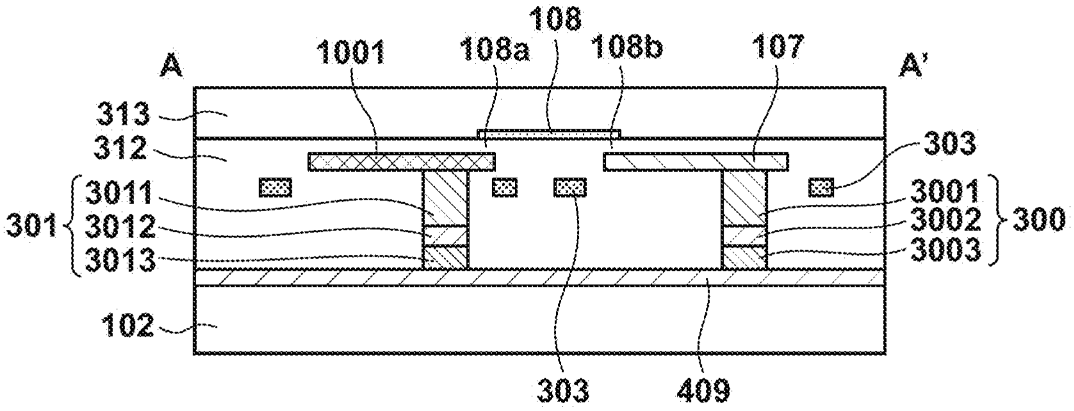
FIG. 12A is a schematic sectional view of the semiconductor substrate according to the fourth embodiment.
Figure 12B:
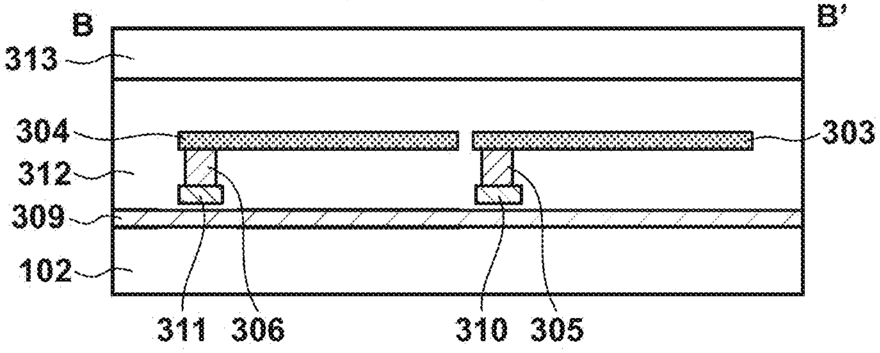
FIG. 12B is a schematic sectional view of the semiconductor substrate according to the fourth embodiment.
Figure 12C:
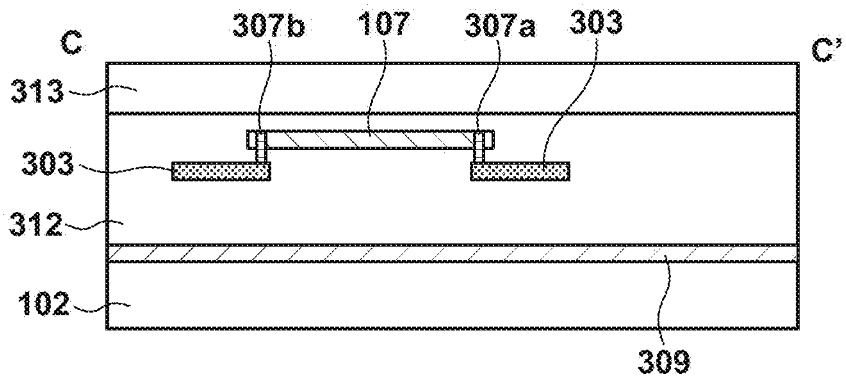
FIG. 12C is a schematic sectional view of the semiconductor substrate according to the fourth embodiment.

FIG. 11 is a schematic plan view of the transmission/reception apparatus 1000*a* or 1000*b* according to this embodiment. FIGS. 12A to 12C are schematic sectional views taken along lines A-A', B-B', and C-C' in FIG. 11, respectively. The left structure in FIG. 11 indicates the transmission antenna 104, and the right structure indicates the reception antenna 103. A description of the same parts as in FIG. 4 will be omitted. A central rectangular portion of the transmission antenna 104 indicates an upper conductor 1001 functioning as the resonance unit 302 in FIG. 4. Similar to the upper conductor 107 for reception, feeding vias 308*a* and 308*b* are arranged on the upper conductor 1001. The remaining components are different only in shapes, and a description thereof is the same as for FIGS. 4 and 5A to 5C. In this embodiment, the transmission antenna 104 and the reception antenna 103 are arranged adjacent to each other. However, these antennas may be arranged apart from each other in the semiconductor substrate 102 so as not to receive the influence of an electromagnetic wave by transmission output or the influence of an electromagnetic wave by reception. The coupling wire 108 is formed with a length of $N\times(\lambda/2)$ (N is an integer) by setting, to λ, the wavelength of the signal 2 transmitted through the coupling wire 108 so as to transmit the frequency component $f_2$ of the signal 2 on the semiconductor substrate with less attenuation.

By using this embodiment, it is possible to configure an application for receiving, by the reception antenna 103, as the terahertz wave 101, an electromagnetic wave obtained when the terahertz wave 1005 transmitted from the transmission antenna 104 hits a target (object) existing in the emission direction of the electromagnetic wave and is reflected and returned. In this case, since the emitted electromagnetic wave is based on the signal 2, and the synchronous signal of the reception antenna 103 is also the signal 2, the homodyne reception apparatus can be constructed. The above-described application can form a radar apparatus as an example of an apparatus using the transmission/reception apparatus.

In addition, it is possible to construct a communication system in which the same antenna apparatus is arranged on the opposite side of the terahertz waves 101 and 1005 to be transmitted/received and the two antenna apparatuses exchange transmission/reception signals. In this case, it is possible to construct a homodyne reception apparatus in a case where the oscillation frequency of the element on the opposite side is the same, and construct a heterodyne reception apparatus in a case where the oscillation frequency is different. In the latter case, in the self-transmission/reception apparatus and the transmission/reception apparatus on the opposite side, the difference between the internal oscillation frequency (the frequency $f_2$ of the signal 2) and the frequency ($f_1$) of the received electromagnetic wave is the same. Therefore, as the detection circuit, a similar arrangement can be used. In this arrangement, it is possible to implement a full duplex communication apparatus.

As described above, according to this embodiment, the transmission and reception antennas can be formed on the same substrate and the oscillation frequencies can be synchronized with each other in both the active antennas. By calculating a change in frequency or a change in phase of the transmitted/received signal by signal processing, it is possible to efficiently perform correction processing, analysis processing, and the like of the signal, and use the signal for a high-performance radar apparatus and communication apparatus.

Fifth Embodiment

Figure 13:
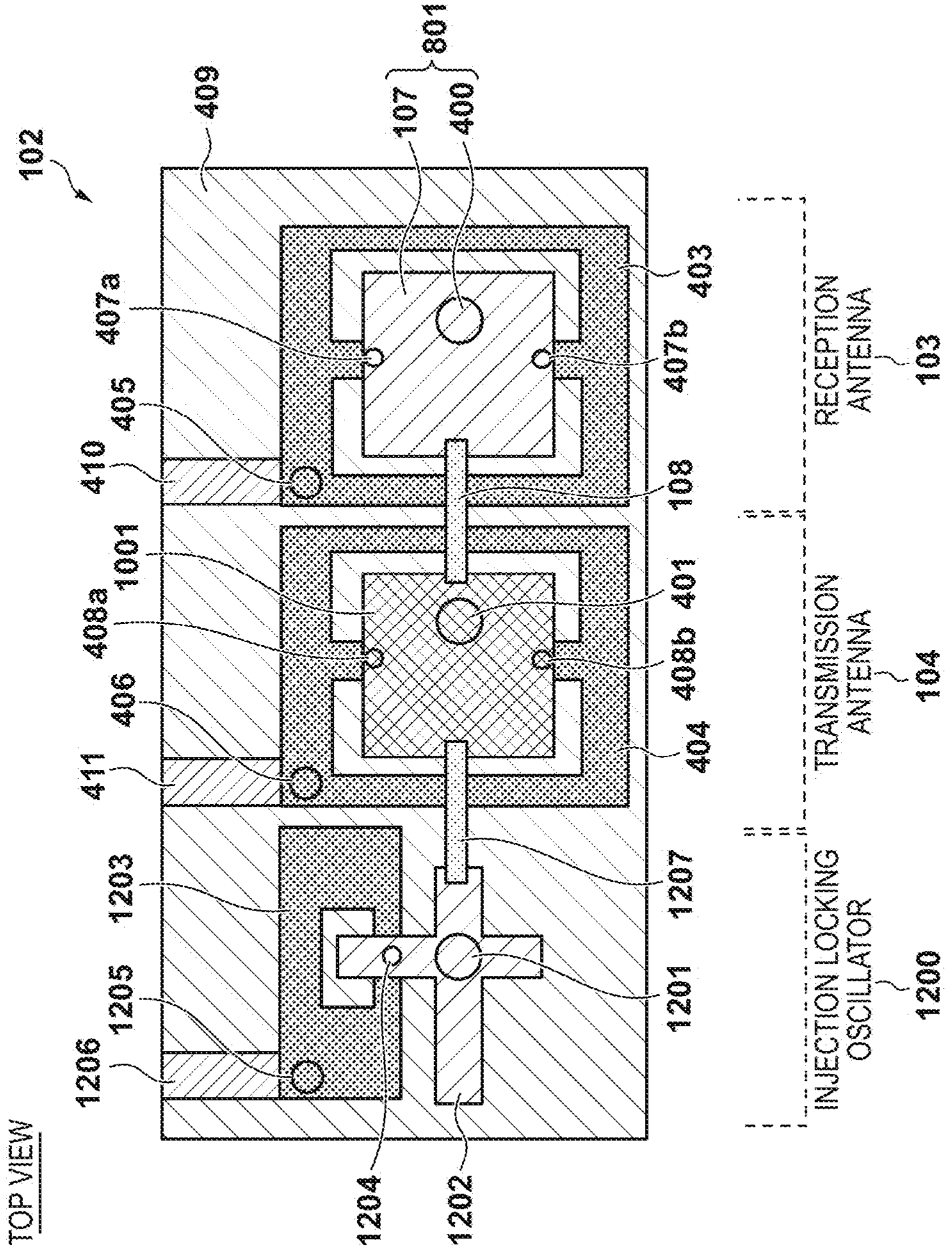
FIG. 13 is a schematic plan view of a semiconductor substrate according to the fifth embodiment.

The fifth embodiment as a modification of the fourth embodiment will be described. FIG. 13 is a view for explaining an arrangement according to this embodiment. The arrangement of a transmission antenna 104 at the center and a reception antenna 103 on the right side in FIG. 13 is the same as the arrangement of the transmission antenna 104 and the reception antenna 103 of the fourth embodiment described with reference to FIG. 11 and a description thereof will be omitted. In an example shown in FIG. 13, an injection locking oscillator 1200 is connected to the transmission antenna 104. The injection locking oscillator 1200 is an oscillator including a third negative-resistance element 1201 and a resonance unit 1202. These are connected to a third bias conductive layer 1203 by a via 1204 connected to the resonance unit 1202, and power input from an external bias control unit is input from a third bias via 1205 through a third bias wiring 1206. This applies a bias voltage to the third negative-resistance element 1201.

A structure is the same as that of the oscillation unit 104 described with reference to FIG. 4 and a detailed description thereof will be omitted. A signal generated in the injection locking oscillator 1200 is input to the transmission antenna 104 through a coupling transmission wire 1207, thereby performing injection locking of the transmission antenna 104. In this embodiment, the transmission antenna 104 and the reception antenna 103 are coupled by a coupling wire 108 but noise may increase due to crosstalk between a transmission signal of the transmission antenna 104 and a reception signal of the reception antenna 103. To cope with this, to ensure isolation between the transmission and reception signals, the injection locking oscillator 1200 may be arranged at the center and the coupling line may be connected to the transmission antenna 104 and the reception antenna 103 arranged by sandwiching the injection locking oscillator 1200. That is, the arrangement of the injection locking oscillator 1200 and the active antennas 103 and 104 is not limited to that shown in FIG. 13.

According to this embodiment, even if the oscillation accuracy of the transmission antenna 104 is low and phase noise is large, it is possible to attempt to improve the oscillation accuracy by an injection locking signal from a higher accurate oscillator. Furthermore, this embodiment describes the injection locking oscillator 1200 using the oscillator by the negative-resistance element arranged on the same substrate. However, injection locking may be performed with reference to a signal input from the outside of the semiconductor, and the arrangement of the injection locking oscillator 1200 is not limited to that shown in FIG. 13.

Sixth Embodiment

Figure 14:
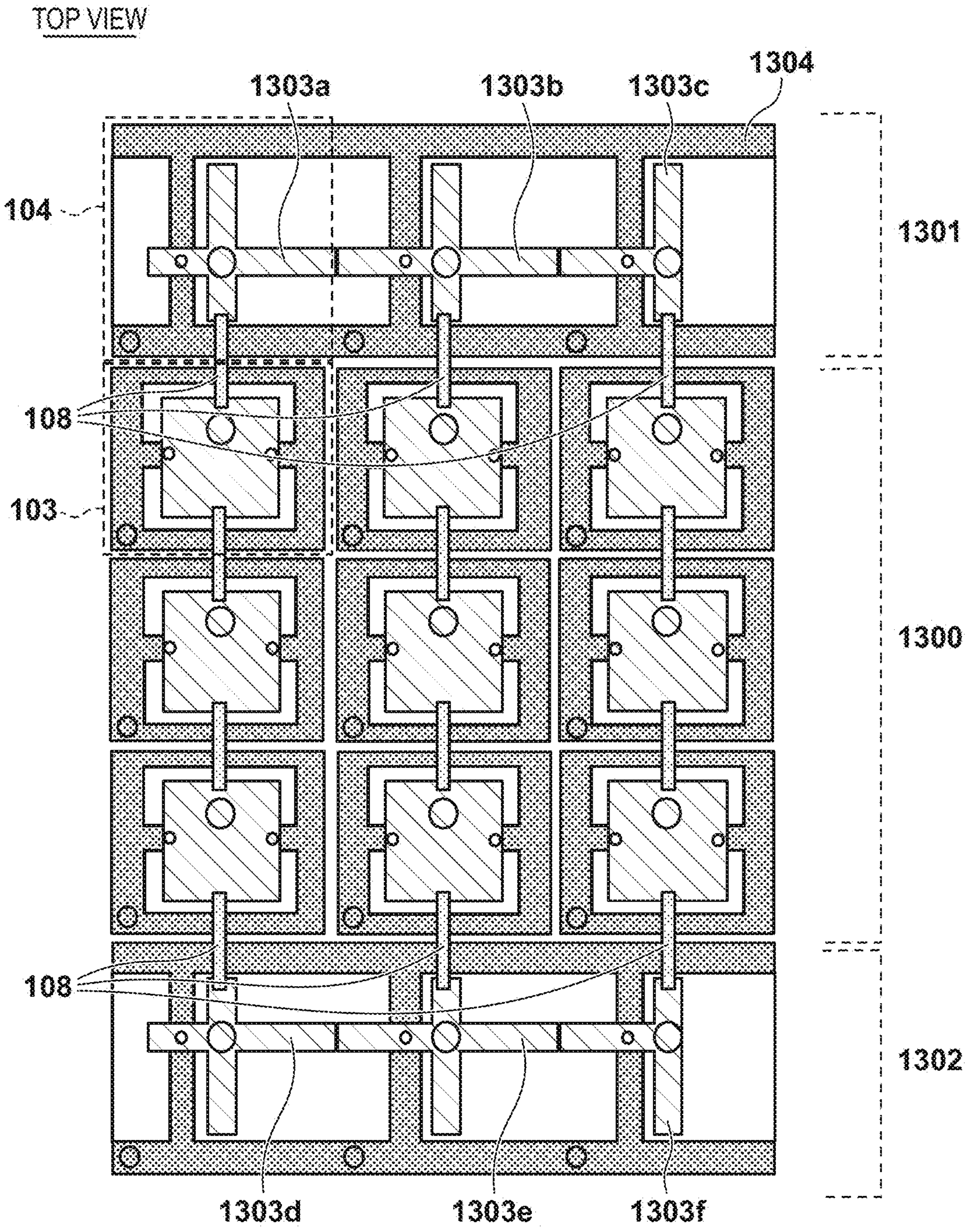
FIG. 14 is a schematic plan view of a semiconductor substrate according to the sixth embodiment.

Next, the arrangement of a reception apparatus including a reception active antenna array in which a plurality of reception antennas 103 are arranged will be described as the sixth embodiment. FIG. 14 is a schematic plan view of the reception apparatus. An active antenna array 1300 in which M×N (M=3 and N=3) reception antennas 103 are arranged is arranged at the center. An oscillation unit array 1301 in which a plurality of oscillation units 104 are arranged is arranged on the upper side, and is connected to some of the reception antennas 103 of the reception active antenna array by coupling wires 108. An oscillation unit array 1302 in which a plurality of oscillation units 104 are arranged is arranged on the lower side of the array, and is connected to some of the reception antennas 103 of the active antenna array 1300 by coupling wires 108. Resonance units 1303*a*, 1303*b*, 1303*c*, 1303*d*, 1303*e*, and 1303*f* in the upper and lower oscillation unit arrays have different shapes but each resonance unit resonates by a negative-resistance element and the oscillation unit to generate a signal 2. The resonance units are coupled and can synchronize the oscillation frequencies with each other.

When a bias conductive layer 1304 of the oscillation unit array is a region common to the oscillation structures, it is possible to reduce the influence of inductance at the time of synchronous coupling of the oscillation units. The bias conductive layer 1304 may be provided for each oscillation unit. When the reception active antennas of the active antenna array 1300 receive signals from the oscillation unit array to excite, they oscillate in synchronism with each other. With respect to the reception active antennas not connected to the oscillation unit array by the coupling wires 108, the oscillation frequencies are synchronized between the antennas by electrically coupling the reception active antennas by coupling wires. Thus, each antenna functions as a receiver described in each of the above embodiments. In the active antenna array, M and N need only be integers of 1 or more.

As described in this embodiment, by forming the active antenna array by arranging the reception antennas, this arrangement can be applied to an imaging apparatus. The imaging apparatus can perform analysis and display by receiving a terahertz wave 101 using each antenna as a pixel and performing image processing for a detection signal. Since all the pixels in the active antenna array can receive the terahertz wave in synchronism with each other, it is possible to acquire information concerning the phase of the received terahertz wave, and to perform not only imaging of the incident terahertz wave but also identification of a material and determination of a distance.

Seventh Embodiment

Figure 15:
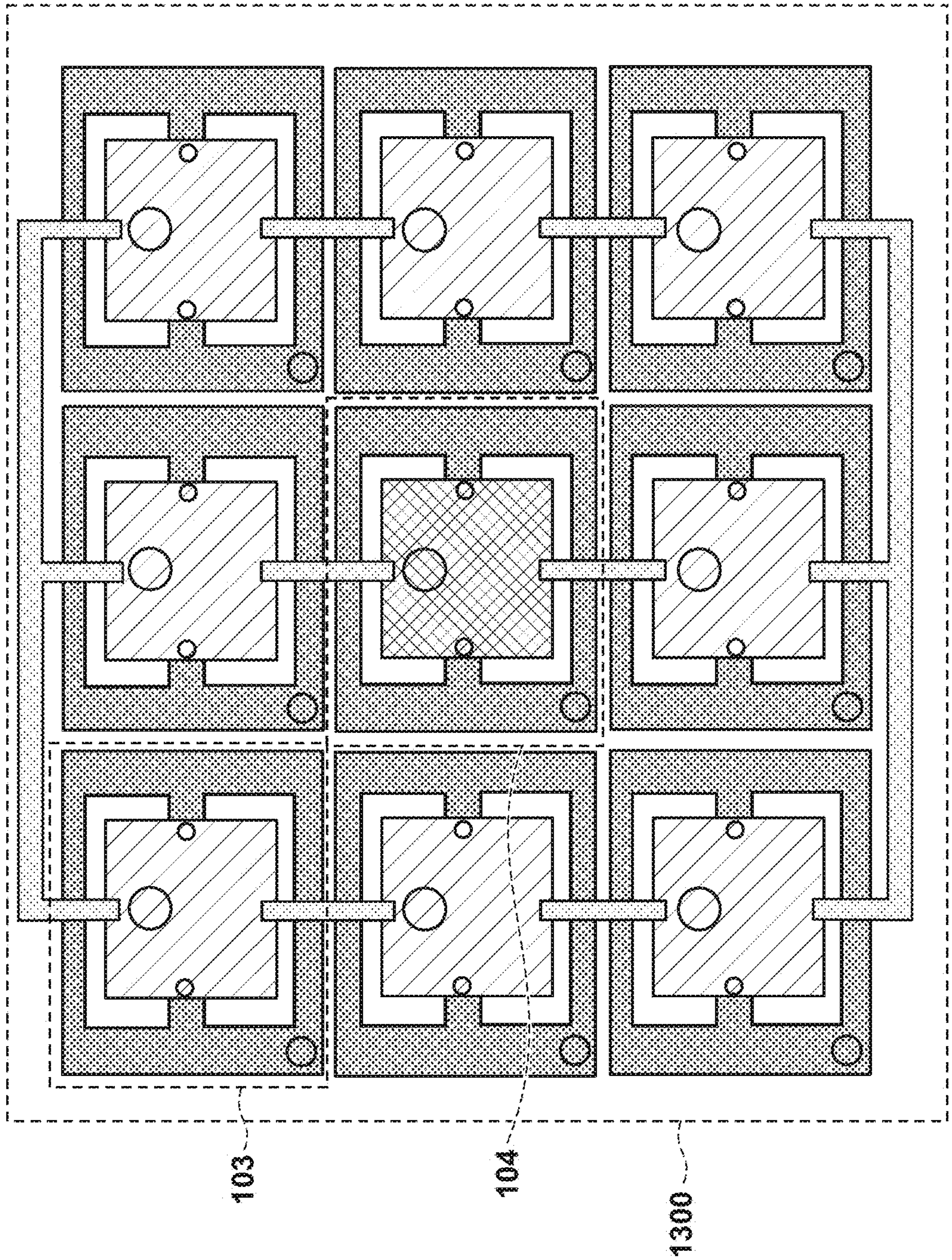
FIG. 15 is a schematic plan view of a semiconductor substrate according to the seventh embodiment.
Figure 16:
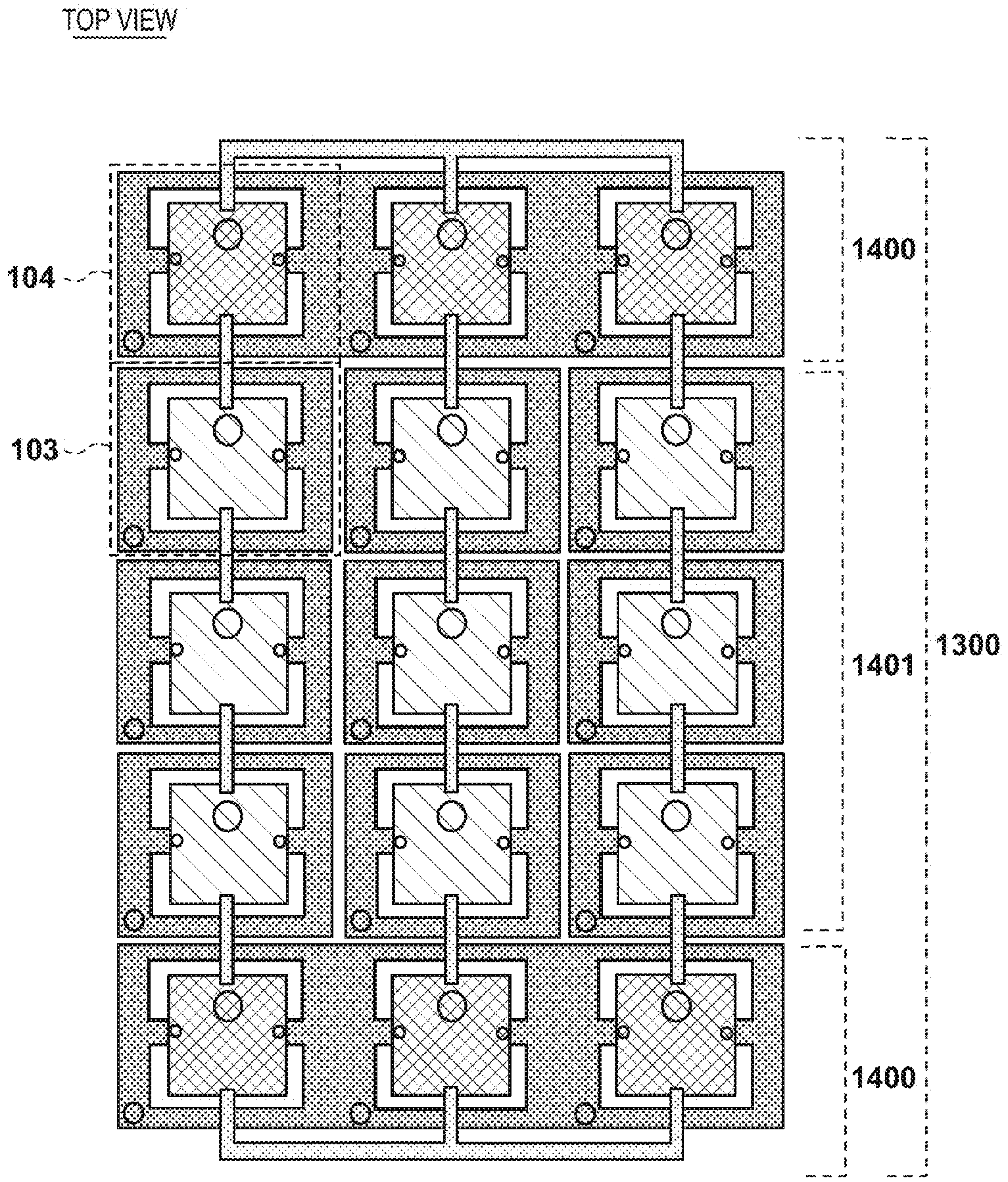
FIG. 16 is a schematic plan view of the semiconductor substrate according to the seventh embodiment.

According to the seventh embodiment, as shown in FIG. 15, some of active antennas in a 3×3 active antenna array 1300 may be set as reception antennas 103 and some of the active antennas may be set as transmission antennas 104. This embodiment assumes that in the 3×3 active antenna array 1300, one central element is set as the transmission antenna 104 and the remaining eight elements are set as the reception antennas 103. The reception antennas 103 arranged on the upper and lower sides in a central column are connected to the central transmission antenna 104 by coupling wires and are synchronized with each other. Furthermore, the remaining reception antennas 103 are connected to the synchronized reception antennas 103 by coupling wires, and synchronously perform reception. The arrangement of the elements of the transmission antenna 104 and the reception antennas 103 is not limited to this. As shown in FIG. 16, an oscillation unit array shown in FIG. 14 may be a transmission active antenna array 1400 and central 3×3 elements may form a reception active antenna array 1401. In this case, a 3×5 active antenna array 1300 is obtained. The reception active antenna array 1401 can synchronously perform reception by a synchronous signal from the transmission active antenna array 1400.

This embodiment can be applied to a MIMO (Multiple-Input Multiple-Output) antenna including a plurality of transmission active antennas and a plurality of reception active antennas. The MIMO antenna can simultaneously transmit data using a plurality of antennas, and can contribute to improvement of the speed of wireless communication and stabilization of a radio wave.

Eighth Embodiment

Figure 17:
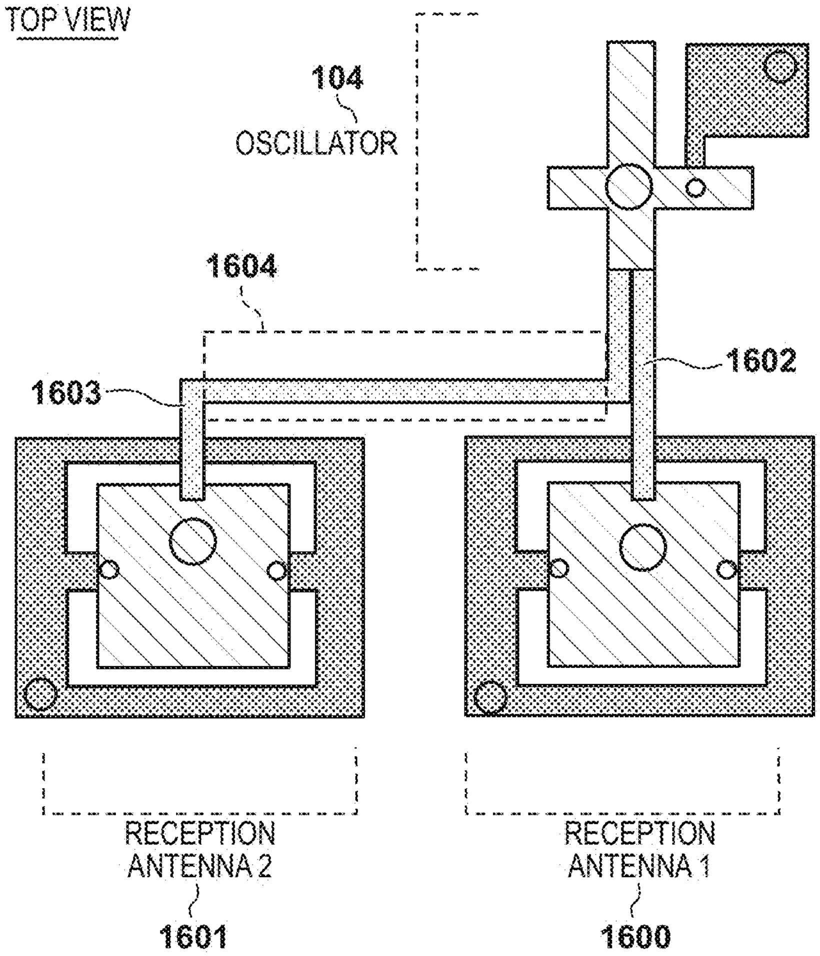
FIG. 17 is a schematic plan view of a semiconductor substrate according to the eighth embodiment.

As shown in FIG. 17, two first and second reception antennas 1600 and 1601 may be connected to an oscillation unit 104 by first and second coupling wires 1602 and 1603, respectively. In this case, by making the impedances of the first and second coupling wires 1602 and 1603 different from each other, the electrical length of a signal transmitted through a line is changed. The second coupling wire 1603 functions as a phase conversion unit 1604 that converts a phase, by having a line different from that of the first coupling wire 1602. This can change the phase of a synchronous signal that is synchronized with the first reception antenna 1600 and the second reception antenna 1601.

Figure 18:
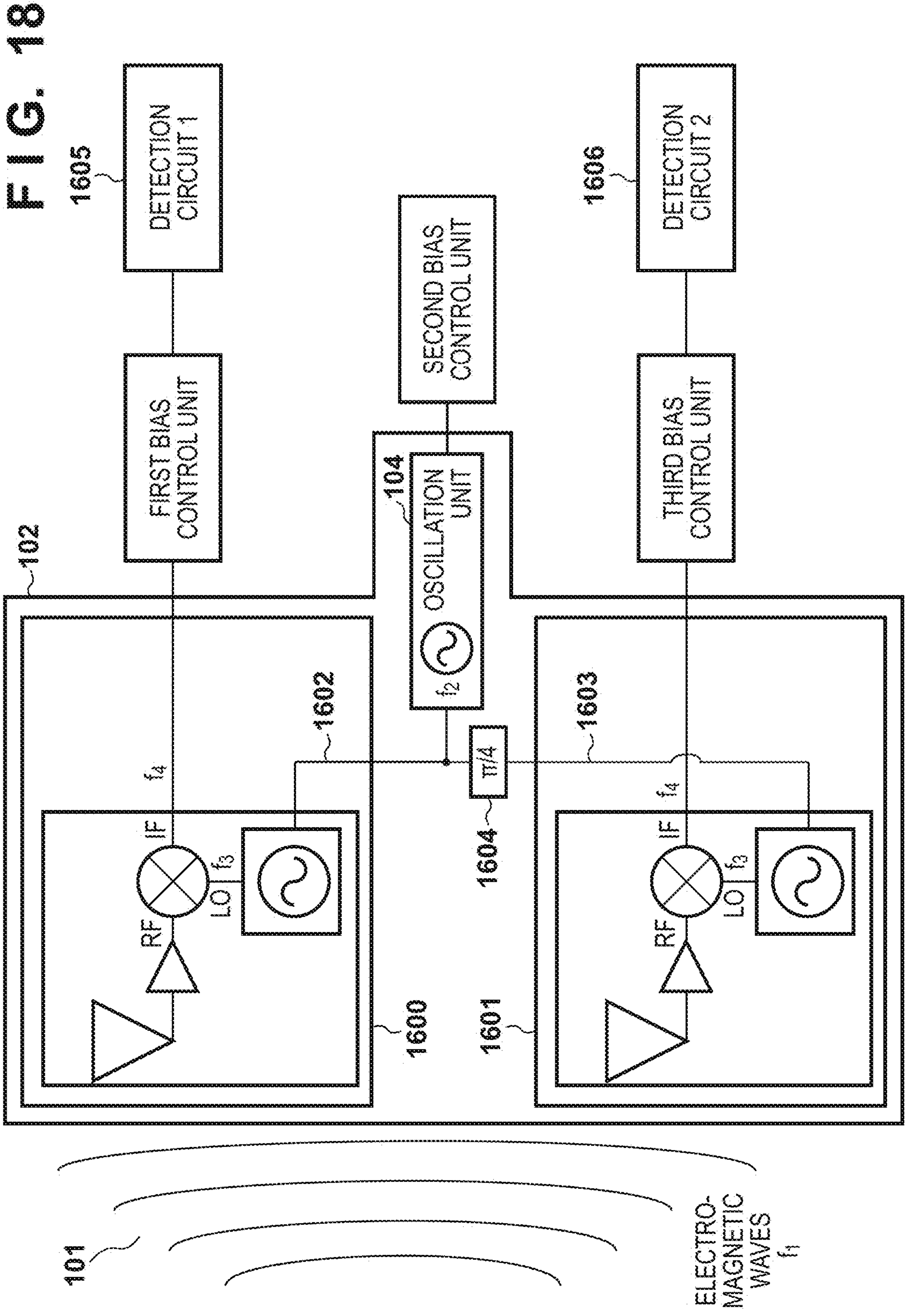
FIG. 18 is a block diagram showing an antenna apparatus according to the eighth embodiment.

FIG. 18 shows a reception apparatus in which an orthogonal mixer is formed by a plurality of reception antennas according to the eighth embodiment. The first reception antenna 1600 and the second reception antenna 1601 are arranged on a semiconductor substrate 102, and the first and second coupling wires 1602 and 1603 are coupled to share the oscillation unit 104 and a received terahertz wave 101. Alternatively, a plurality of oscillation units 104 may be arranged on the semiconductor substrate 102, the oscillation units may be synchronized with each other to generate a common frequency and phase, and the different oscillation units may be synchronized with the first and second reception antennas 1600 and 1601 via the coupling wires.

Each reception antenna connects a signal from the oscillation unit 104 via the coupling wire 1602 or 1603. However, the phase conversion unit 1604 inputs oscillation signals of different phases to the reception antenna 1600 and the second reception antenna 1601. The phase conversion unit 1604 makes impedance in the wiring different between the first coupling wire 1602 and the second coupling wire 1603, and shifts the phase of the synchronous signal by $\pi/4$ (45°). Thus, the first reception antenna 1600 and the second reception antenna 1601 can be made to function as orthogonal mixer apparatuses with the same frequency and a phase shift of $\pi/4$. By adjusting the frequency $f_2$ of the oscillation unit 104 to the frequency $f_1$ of the received terahertz wave 101, it is possible to implement a direct conversion reception apparatus using a homodyne detector.

In this embodiment, the two reception antennas are used. However, more reception active antennas may be used and the phase conversion units of the coupling lines at this time may be the same or different. Only conversion of $\pi/4$ is described for the phase conversion unit but $\pi/2$ or another phase may be adopted. A phase conversion unit may be provided in each of the first and second coupling wire 1602 and 1603. The frequency ($f_1$) of the signal 1 of the received terahertz wave 101 and the frequency ($f_2$) of the signal 2 of the oscillation unit 104 are equal to each other but may be different from each other. Even if $f_1$ and $f_2$ are different from each other, the reception apparatus of this embodiment can be applied as an image removal mixer of a heterodyne detector. A first detection circuit (detection circuit 1) 1605 and a second detection circuit (detection circuit 2) 1606 are described separately but may be implemented as a common detection circuit that inputs a plurality of detection signals. This embodiment also includes another form in which the plurality of reception antennas synchronously receive the oscillation signals by shifting the phases of the oscillation signals by the coupling wires.

One of the detection signals output from the two reception antennas is extracted as the I signal and the other is extracted as the Q signal, and thus the reception apparatus functions as an orthogonal mixer. The orthogonal mixer can calculate the amplitude and phase of the reception signal by performing demodulation by combining the I signal and the Q signal in the first detection circuit 1605 and the second detection circuit 1606 connected to the orthogonal mixer. This can cope with a modulation method such as amplitude modulation, phase modulation, frequency modulation, or a modulation signal (QAM) obtained by combining these modulation methods. The image removal mixer removes, by signal processing, an unnecessary image frequency component generated when converting a received signal into a low-frequency signal, and can be implemented by separately extracting the I signal and Q signal. In either case, the reception apparatus of this embodiment can be used to improve the detection accuracy of the reception apparatus and signal quality.

Ninth Embodiment

Figure 19:
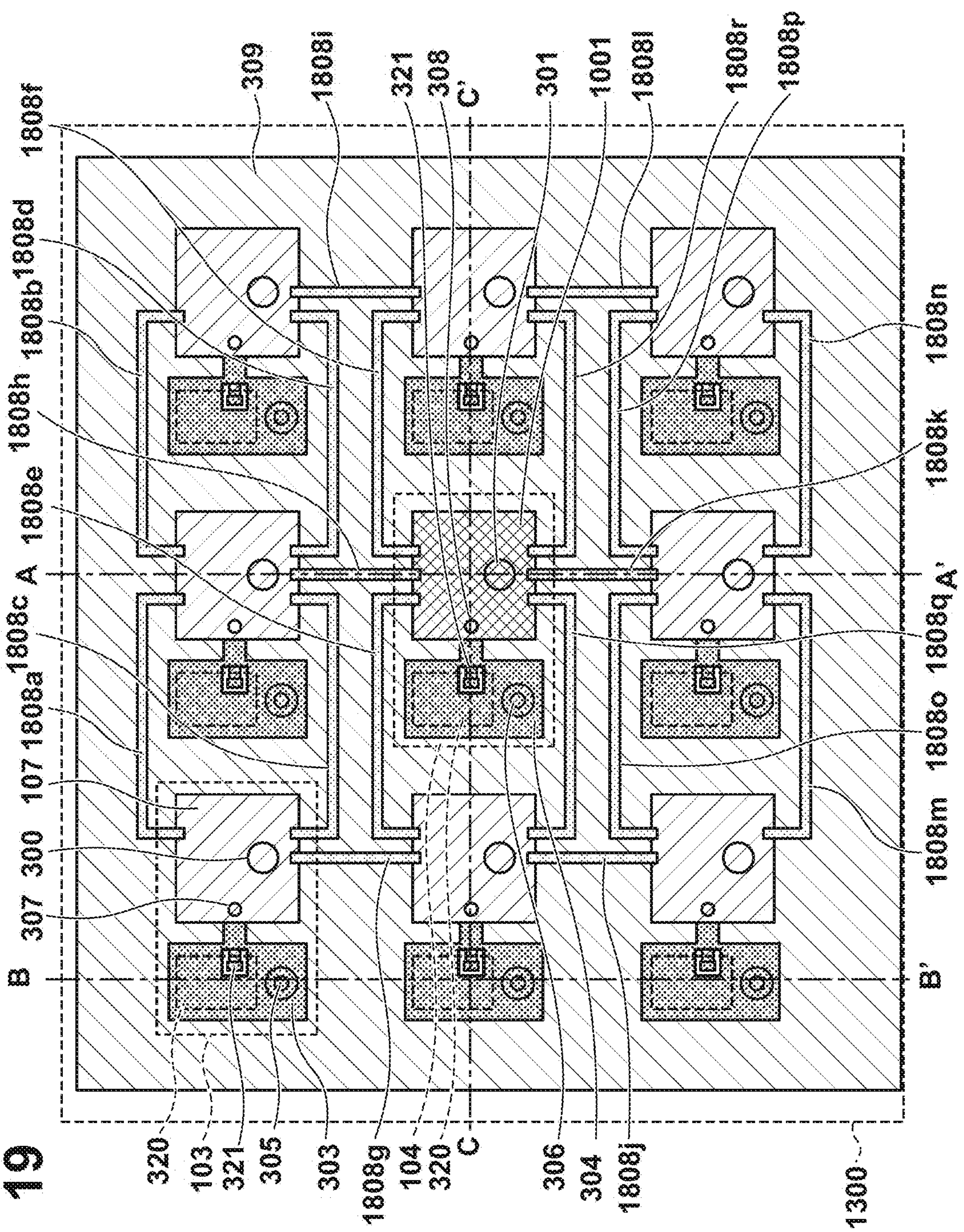
FIG. 19 is a schematic plan view of a stacked substrate according to the ninth embodiment.
Figure 20A:
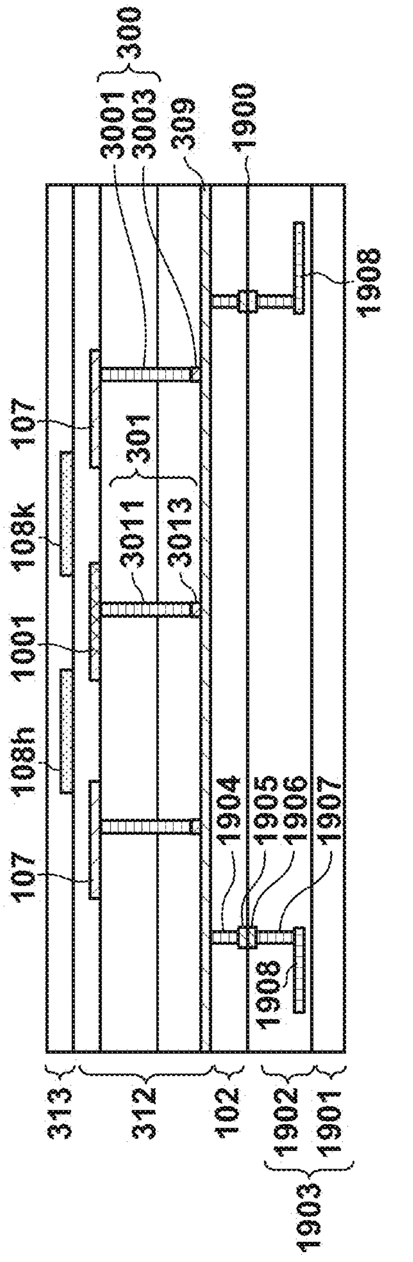
FIG. 20A is a schematic sectional view of the stacked substrate according to the ninth embodiment.
Figure 20B:
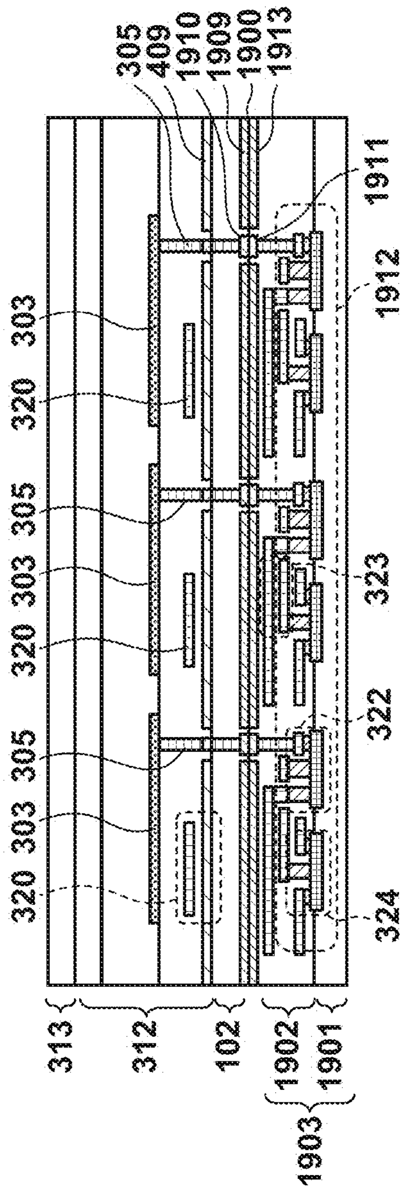
FIG. 20B is a schematic sectional view of the stacked substrate according to the ninth embodiment.
Figure 20C:
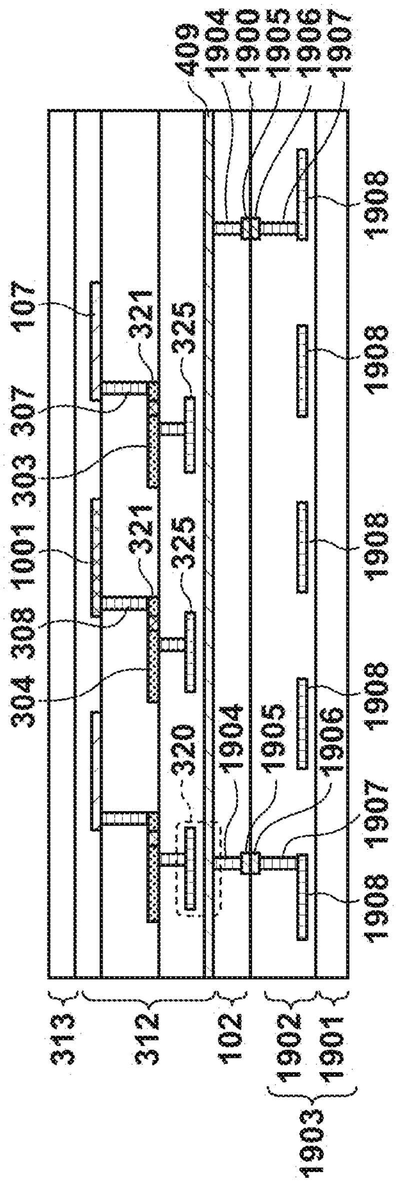
FIG. 20C is a schematic sectional view of the stacked substrate according to the ninth embodiment.

In the ninth embodiment, a method of stacking, by a semiconductor stacking technique, a semiconductor substrate on which an active antenna array is arranged and an integrated circuit substrate such as a CMOS integrated circuit will be described with reference to FIG. 19. FIG. 19 is a schematic plan view of an antenna apparatus according to this embodiment. This is obtained by changing the shape of a part for semiconductor stacking in the schematic plan view in which transmission antennas 104 are arranged in an array and reception antennas 103 are arranged in an array in the sixth embodiment. FIGS. 20A to 20C are schematic sectional views taken along lines A-A', B-B', and C-C' in FIG. 19, respectively. Similar to FIG. 15, in an active antenna array 1300, only one central element serves as a transmission antenna 104 and elements around the central element serve as reception antennas 103.

The reception antenna 103 is a patch antenna having a structure in which an upper conductor 107 as an upper conductor for the reception antenna and a GND layer 309 of a conductor layer as a reflector sandwich a first negative-resistance element 300 and an insulator and dielectric layer 312. The upper terminal of the first negative-resistance element 300 is electrically connected to the upper conductor 107, and an RTD 3003 is electrically connected to an antenna-element via 3001. The lower terminal of the first negative-resistance element 300 is electrically connected to the GND layer 309. The upper conductor 107 is connected to a first bias conductive layer 303 for individual bias via a feeding via 307 at the position of the node of a resonance electric field at $f_{THz}$. With this structure, biases can be applied to the upper and lower sides of the first negative-resistance element 300. The first bias conductive layer 303 is connected to a MIM capacitor 320 via a MIM capacitor connection portion 321. The MIM capacitor connection portion 321 includes a resistance layer using TiW, and plays the role of an AC short circuit series-connected to the MIM capacitor structure. The MIM (Metal Insulator Metal) capacitor is a capacitive element that sandwiches a dielectric layer by metal members. That is, the MIM capacitor includes a conductor and the dielectric layer serving as two electrodes. The MIM capacitor performs self-oscillation by applying a bias voltage that generates a negative resistance in the negative-resistance element but serves to prevent destabilization of oscillation and a decrease in output caused by a parasitic oscillation. The transmission antenna 104 has substantially the same arrangement as that of the reception active antenna except that an upper conductor 1001 as an upper conductor for the transmission antenna is provided. These antennas are connected by a plurality of coupling wires 1808*a* to 1808*r* and synchronized.

FIG. 20A shows the sectional structure of each active antenna 103 or 104. The structure of the antenna portion is the same as in FIG. 5A and a description thereof will be omitted. A bonding portion 1900 exists on the rear surface of a semiconductor substrate 102, and bonds the outermost surface, on the side of the bonding portion 1900, of a compound semiconductor substrate as the base material of the semiconductor substrate 102 to the outermost surface, on the side of the bonding portion 1900, of an integrated circuit substrate 1903 on which an integrated circuit is formed. In the integrated circuit substrate 1903, an integrated circuit region 1912 is formed, and includes a second semiconductor substrate 1901 as a base material and a driving circuit formed in an integrated circuit insulating layer 1902. The bonding portion 1900 is a bonding interface at which a conductor layer formed on the rear surface of the semiconductor substrate 102 is directly bonded to the metal of a conductor layer exposed to the outermost layer of the integrated circuit substrate 1903. In this case, as a bonding form, metal bonding such as Cu—Cu bonding, insulator bonding such as $SIO_x$—$SiO_x$ bonding, adhesive bonding using an adhesive such as BCB, or hybrid bonding as a combination of these can be used. As a bonding process, low-temperature bonding using plasma activation or conventional thermocompression bonding is used. A method of bonding semiconductor wafers of the same size, a method of bonding semiconductor wafers of different sizes, a method (tiling) of separately bonding a plurality of semiconductor chips to a wafer, or the like is used. In a driving circuit integrated in the integrated circuit region 1912 as well, the connections and structures have been described as examples of this embodiment but are not limited to them.

Referring to FIG. 20A, the GND layer 309 of the semiconductor substrate 102 is electrically connected to a GND layer 1908 of the integrated circuit substrate 1903. The semiconductor substrate 102 includes a GND via 1904 extending from the GND layer 309 in the direction of the bonding portion 1900, and a GND terminal 1905 formed on the bonding surface. To the contrary, the GND layer 1908 of the integrated circuit substrate 1903 includes a GND via 1907 extending to the bonding portion 1900, and a GND terminal 1906 formed on the bonding surface. Both the GND terminals 1905 and 1906 are electrically coupled at the bonding portion, and share a GND potential.

Referring to FIGS. 20B and 20C, the MIM capacitor 320 is provided in the bias path of the semiconductor substrate 102. The MIM capacitor 320 includes a conductor layer 325 and the GND layer 309 as a conductor layer. The conductor layer 325 and the GND layer 309 can function as electrodes. The conductor layer 325 is connected to the MIM capacitor connection portion 321. The MIM capacitor connection portion 321 extends from the bias conductive layers 303 and 304. The bias conductive layers 303 and 304 are connected to the upper conductor 107 of the reception antenna 103 and the upper conductor 1001 of the transmission antenna 104 via the feeding vias 307 and 308. As long as a capacitance is formed, a MIS structure may be adopted, and the present invention is not limited to this. Furthermore, the GND layer 1908 of the integrated circuit substrate 1903 may be shared with the GND potential and the GND layer of the integrated circuit region 1912 of the integrated circuit substrate 1903 or a plurality of GND layers 1908 may be provided. The GND layers 309 and 1908 may be formed in a solid pattern. As an example of enhancing the bonding strength, dummy terminals 1909 and 1913 not connected to signal lines may be provided in the bonding portion 1900. By arranging the dummy terminals 1909 and 1913 in a region where no wiring electrode is necessary, the bonding strength can be enhanced, thereby contributing to improvement of the yield and reliability. In this example, a bonding area formed by the dummy terminals 1909 and 1913 is larger than the bonding area of another bonding portion. Thus, the bonding strength can be enhanced. The dummy terminals 1909 and 1913 may form the area equal to that of another bonding portion and a plurality of dummy terminals may be provided. This arrangement can also enhance the bonding strength. This arrangement of GND can reduce the influence of electromagnetic wave noise, caused by the integrated circuit of the integrated circuit substrate 1903, on the active antennas 103 and 104 of the semiconductor substrate 102. Note that the solid pattern indicates an arrangement having an arbitrary area in a planar view.

Bias control will be described. On the side of the semiconductor substrate 102, the first bias via 305, a wiring layer provided in an opening of the GND layer 309, and a through via formed in the semiconductor substrate 102 are connected in this order, and are connected to a conductor 1910 that forms an electrode as a bias terminal formed on the bonding surface of the bonding portion 1900. Similarly, on the side of the integrated circuit substrate 1903, a bias terminal 1911 formed on the bonding surface of the bonding portion 1900 is electrically connected to a MOSFET 1322 as a transistor formed in the integrated circuit region 1912. The MOSFET 1322 forms a gate-grounded amplification circuit as an amplifier of the first stage. An amplified signal is further amplified by a source-grounded amplification circuit including a MOSFET 2324. The gate-grounded amplification circuit and the source-grounded amplification circuit are coupled by a MIM capacitor 323 for AC coupling. The MIM capacitor 323 is merely an example, and may have an arrangement using the gate insulating film capacitance of an FET. The MOSFET 1322 also serves as a bias control unit, and the semiconductor substrate is connected via the MOSFET 1322 to apply a bias voltage to the negative-resistance element 300 and a negative-resistance element 301. Alternatively, an arrangement in which a terminal for applying a bias voltage is provided on the integrated circuit substrate 1903 and a voltage is externally supplied may be adopted.

As in this embodiment, the semiconductor substrate 102 and the integrated circuit substrate 1903 are bonded by a semiconductor bonding technique, thereby eliminating the need to arrange the control circuit around the active antenna on the same plane of the semiconductor substrate 102. This reduces the space in the antenna, where the control circuit is arranged on the same plane, and it is possible to prevent the characteristic of the antenna from degrading due to coupling between the control circuit and the antenna. If bias control and the like are individually executed for each antenna, it is necessary to prepare a bias terminal for each antenna. However, in this embodiment, it is possible to readily perform connection to the integrated circuit substrate 1903 by the through via. Even if the active antenna array is used as in the above-described embodiment, the control circuit can be arranged on the rear side of the semiconductor substrate 102, and it is thus possible to increase the number of antenna arrays without receiving the influence of an arrangement restriction and the like. Since the integrated circuit substrate 1903 is formed by the conventional CMOS technique, a complex circuit can be formed as a detection circuit or a signal processing circuit, and the utility of the terahertz wave reception apparatus according to this embodiment can further be broadened.

10th Embodiment

Figure 21:
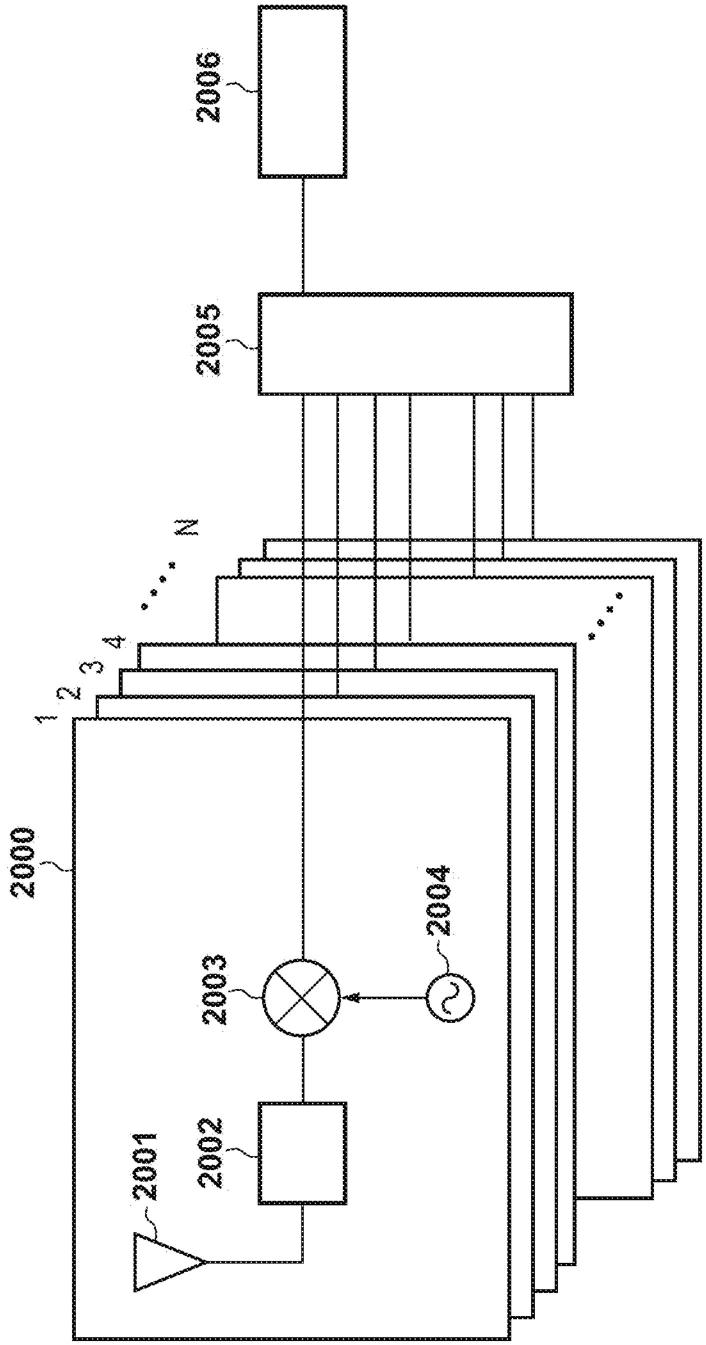
FIG. 21 is a block diagram of an imaging apparatus according to the 10th embodiment.

This embodiment will describe a case where the antenna apparatus of one of the above-described embodiments is applied to a terahertz camera system (image capturing system) with reference to FIG. 21. A plurality of pixel active antennas 2000 each including an antenna 2001, an amplifier 2002, a first mixer 2003, and a local oscillator 2004 as in the present invention are arranged as pixels in an array on a semiconductor substrate. The output of a detection signal undergoes demodulation processing inside or outside the pixel and processing of conversion into a digital value using an ADC by a signal conversion processing unit 2005, and the values of the plurality of pixels are transferred to an arithmetic unit such as an image processing apparatus 2006 to perform image processing. Thus, the antenna apparatus can be used as an imaging apparatus that displays or analyzes, as an image, the signal received by each pixel of the antenna array.

Figure 22:
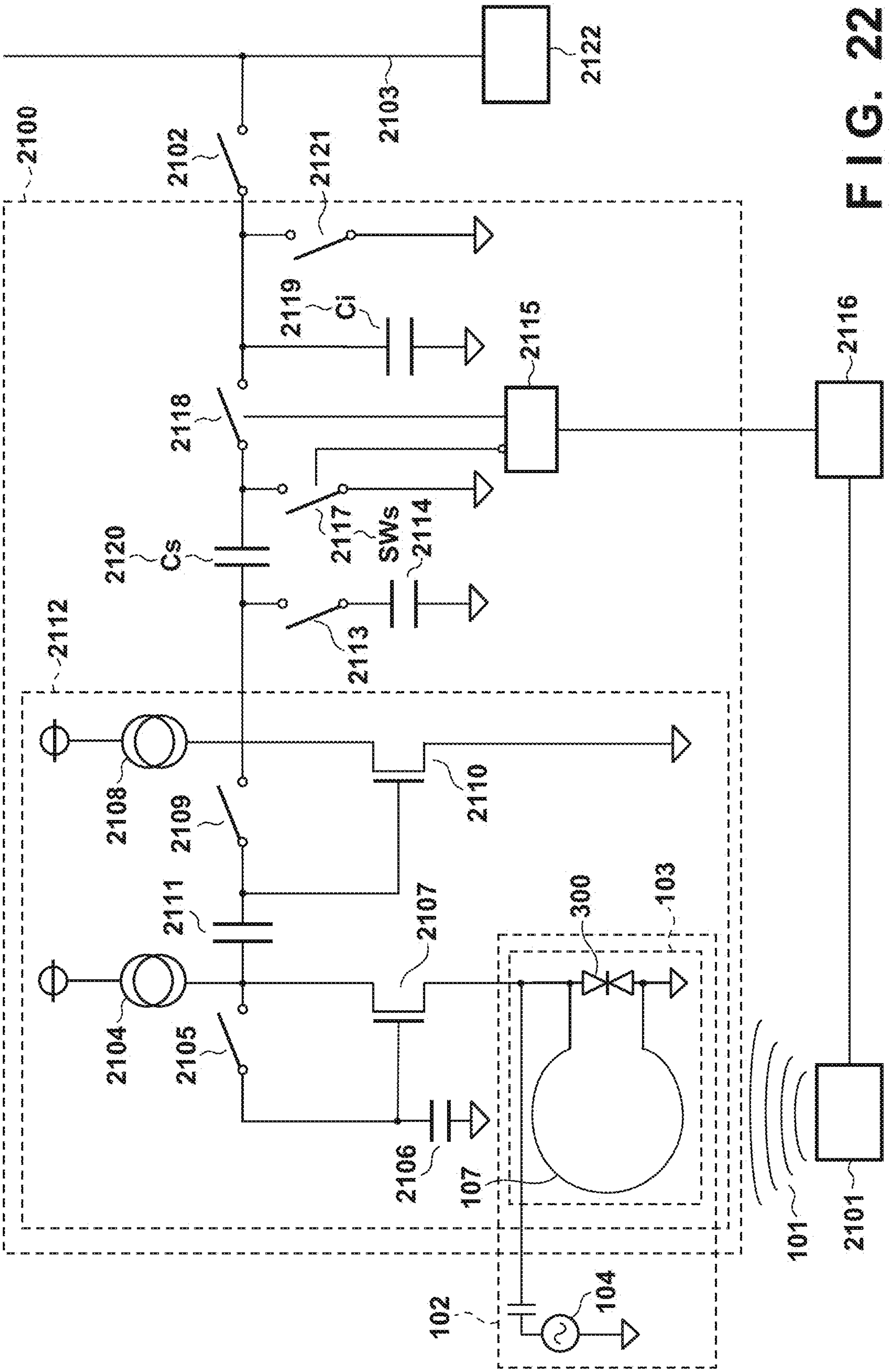
FIG. 22 is a circuit diagram showing examples of the circuit blocks of the imaging apparatus according to the 10th embodiment.

An embodiment of an active imaging apparatus that emits a terahertz wave and receives reflected or transmitted terahertz light will be described. FIG. 22 shows a practical form of the pixel active antenna 2000 and the signal conversion processing unit 2005 shown in FIG. 21. A pixel 2100 shown in FIG. 22 represents one of the plurality of pixels arranged in an M×N (M and N are integers) two-dimensional array. The pixel 2100 includes a reception antenna 103 formed on a semiconductor substrate 102. The reception antenna 103 includes an upper conductor 107 and a first negative-resistance element 300. The resonance frequency of the upper conductor 107 is adjusted to be equal to the frequency of a terahertz wave 101 generated from a transmission unit 2101. The first negative-resistance element 300 is, for example, a resonant tunneling diode (RTD). An oscillation unit 104 is electrically connected to the reception antenna 103 by a coupling wire. The reception antenna 103 and the oscillation unit 104 are formed on the semiconductor substrate 102, and the respective elements of the remaining pixels 2100 are formed on an integrated circuit substrate 1903. In addition to the pixels 2100, the integrated circuit substrate 1903 includes a selection switch 2102 and a readout line 2103 as well as a vertical scanning circuit and a wiring for a signal which are necessary for pixel driving. The circuit of the integrated circuit substrate 1903 is formed on a silicon substrate using a standard CMOS process.

A signal of the reception antenna 103 is amplified by a gate-grounded amplification circuit formed from a current source 2104, a reset switch 2105, a bias capacitor 2106, and an NMOS transistor 2107, and also supplies a bias voltage to the reception active antenna. The amplified signal is further amplified by a source-grounded amplification circuit formed from a current source 2108, a reset switch 2109, and an NMOS transistor 2110. The gate-grounded amplification circuit and the source-grounded amplification circuit are coupled by a capacitor 2111 for AC coupling. A reset operation by each of the reset switches 2105 and 2109 is performed once for one frame or once during a readout period of one row, thereby deciding the operating point of each of the NMOS transistors 2107 and 2110. The output signal of the reception antenna 103 has a voltage as low as about several hundred V corresponding to the magnitude of the input of the terahertz wave. The output signal of the reception antenna 103 is amplified by a gain of about several thousand times by the gate-grounded amplification circuit and the source-grounded amplification circuit, and output as an output signal of a detector 2112. The output signal of the detector 2112 is accumulated by a first storage capacitor Cs 2120. A switch 2113 and a capacitor 2114 form a high-frequency cut filter, and serves to remove electrical noise of the signal output from the detector 2112. The switch 2113 is a filter function selection switch.

Based on a signal received from a signal generator 2116, a non-overlap circuit 2115 supplies, to a switch SWs 2117 and a switch SWi 2118, control signals that do not turn on the switch SWs 2117 and the switch Swi 2118 at the same time. This prevents charges of a second storage capacitor Ci 2119 from escaping. Assume that the control signal frequencies of the switch SWs 2117 and the switch SWi 2118 are several MHz. The reception antenna 103 may generate low-frequency noise such as 1/f noise. A frequency at which low-frequency noise is buried in white noise is called a noise corner frequency, and it is possible to effectively reduce low-frequency noise as long as a control signal is operated at a frequency equal to or higher than the noise corner frequency.

An accumulation operation according to this embodiment will be described next. An output of the reception antenna 103 when the transmission unit 2101 performs irradiation is amplified by an amplification circuit of the next stage, and is input as an irradiation potential (second potential) to the first storage capacitor Cs 2120. Next, an output of the reception antenna 103 when the transmission unit 2101 performs no irradiation is amplified by the amplification circuit of the next stage, and is input as a non-irradiation potential (first potential) to the first storage capacitor Cs 2120. When the output pulse of the non-overlap circuit 2115 controls the switch SWs 2117 and the switch SWi 2118, a signal proportional to the difference between the irradiation potential and the non-irradiation potential is accumulated in the second storage capacitor Ci 2119 by one integration operation. In this operation, a subtraction operation (irradiation potential—non-irradiation potential) is performed during a period for controlling the switch SWs 2117 and the switch SWi 2118. Since the control cycle of the switch SWs 2117 and the switch SWi 2118 is higher than the cycle of low-frequency noise, the switches can function as filters that cut low-frequency noise such as 1/f noise generated in the output signal of the detector 2112.

The signal generator 2116 is provided outside the reception apparatus. The signal generator 2116 outputs, to the non-overlap circuit 2115, a signal serving as the base of a signal for controlling the switches SWs 2117 and SWi 2118. The signal generator 2116 also outputs, to the transmission unit 2101, a light source on/off control signal of a frequency equal to a signal frequency to be output to the non-overlap circuit 2115. The transmission unit 2101 irradiates an object with the terahertz wave 101 by repeating irradiation and non-irradiation at the same cycle as that of the control signal from the signal generator 2116. The transmission active antenna is used to generate a terahertz wave. The circuit arrangement of the detector 2112 and the generation source of the terahertz wave are not limited to them and a known terahertz wave generation source can be used. The charges accumulated in the second storage capacitor Ci 2119 are read out, as a voltage, into the readout line 2103 via the selection switch 2102. The readout signal is digitized by a signal processing circuit 2122 outside the circuit substrate. The digitized signal is processed by an external image processing apparatus.

By having the pixels 2100 of this embodiment, the terahertz wave reception apparatus of the present invention can be incorporated in an imaging apparatus, and the imaging apparatus can be used as an active imaging apparatus. Furthermore, when the reception antenna 103 operating as the pixel active antenna according to this embodiment performs self-oscillation (self-excitation), thereby making it possible to amplify the signal of the received terahertz wave 101. In this case, the active imaging apparatus can detect a small signal, thereby improving detection accuracy and reducing noise. Note that the 10th embodiment has explained a case where the antenna apparatus of this embodiment is applied to the pixel 2100 as a reception unit. However, the transmission active antenna according to this embodiment may be applied to the transmission unit 2101.

According to the present invention, it is possible to prevent deterioration in signal quality of an oscillation signal supplied to an antenna.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Figure 23:
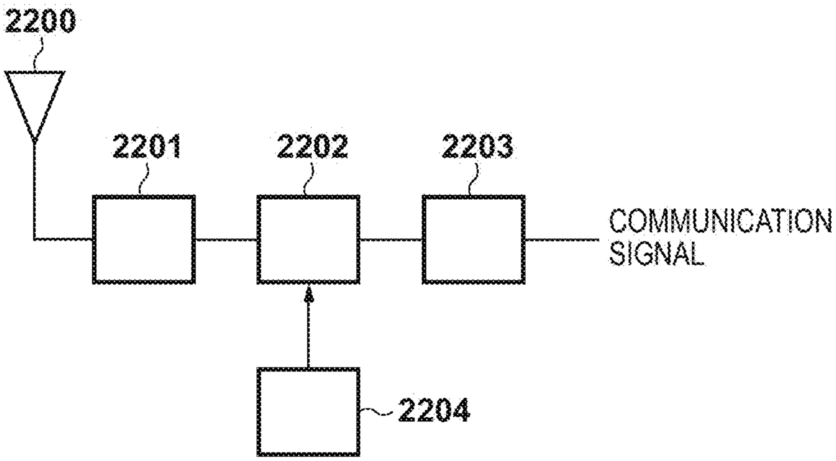
FIG. 23 is a block diagram showing an example of a communication apparatus according to other embodiments.

As other embodiments, a form in which one of the above-described embodiments is applied to a communication system will be described. FIG. 23 is a block diagram of a reception apparatus of the communication system according to other embodiments. A signal received from an antenna 2200 is amplified by an amplifier 2201. The reception apparatus specifically uses a Low Noise Amplifier (LNA) with small noise. A frequency converter 2202 further performs frequency conversion for the amplified signal. At this time, processing of removing a carrier wave component from the received signal is performed by inputting a local oscillation signal from a local oscillator 2204. After the frequency converter 2202, a demodulator 2203 demodulates the signal modulated at the time of transmission. This signal is used as a communication signal. In this embodiment, the antenna 2200, the amplifier 2201, the frequency converter 2202, and the local oscillator 2204 are integrated on a semiconductor substrate, and the demodulator 2203 is used on the detection circuit side, thereby making it possible to apply the reception apparatus as a reception apparatus of a communication signal.

Furthermore, as two methods used for communication, a superheterodyne method and a direct conversion method will be described.

Figure 24A:
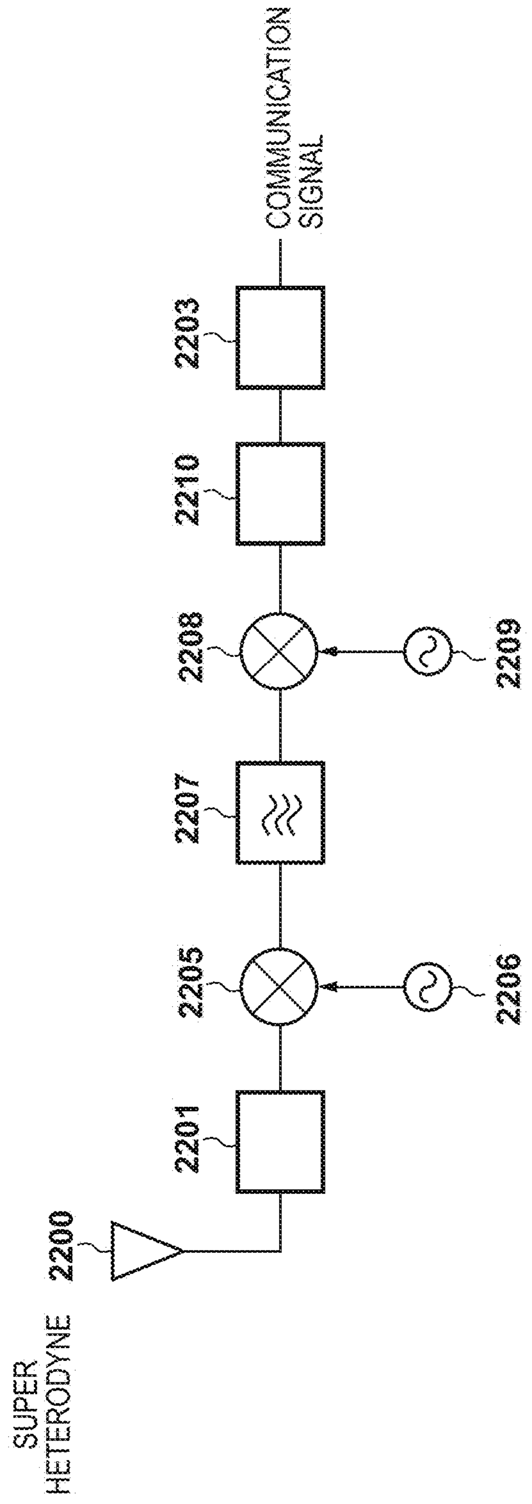
FIG. 24A is a block diagram showing an example of the communication apparatus according to other embodiments.

FIG. 24A is a block diagram of the superheterodyne method. In the superheterodyne method, as shown in FIG. 24A, a first mixer 2205 and a local oscillator 2206 are used to perform frequency conversion for a received signal into an IF signal. After that, in the frequency band of the IF signal, a filter 2207, and a second mixer 2208 and a local oscillator 2209 that further perform frequency conversion are used to separate a detection signal and remove noise. After that, an analog-to-digital converter (ADC) 2210 performs digital conversion, and then the demodulator 2203 demodulates the detection signal. The reception apparatus according to this embodiment is formed on the semiconductor substrate up to the first mixer 2205, and the subsequent signal processing is executed by a detection circuit outside the semiconductor substrate. After the output of the first mixer 2205, it is unnecessary to handle a high frequency in the terahertz band, and thus it is possible to use the arrangement of the conventional detector.

Figure 24B:
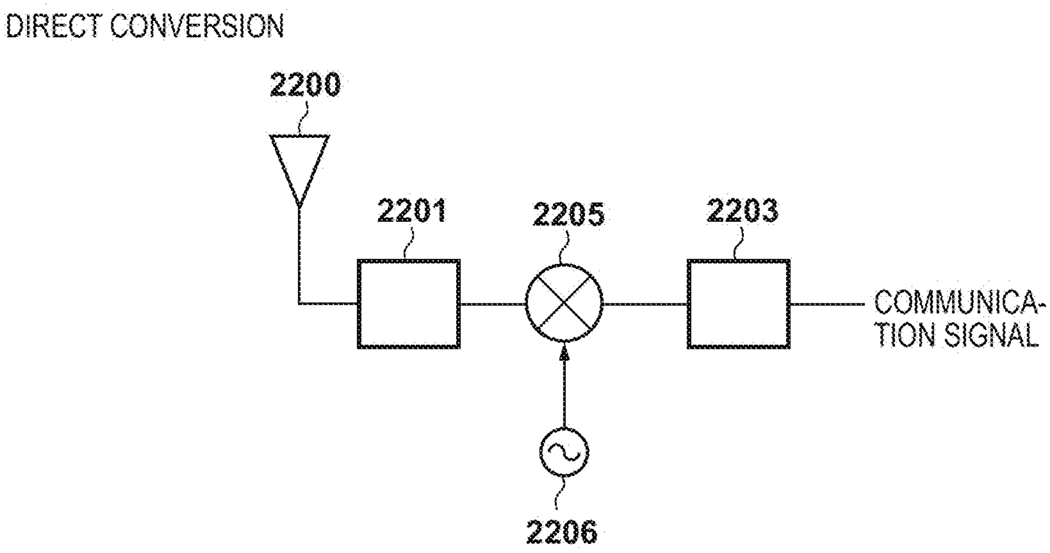
FIG. 24B is a block diagram showing an example of the communication apparatus according to other embodiments.
Figure 25:
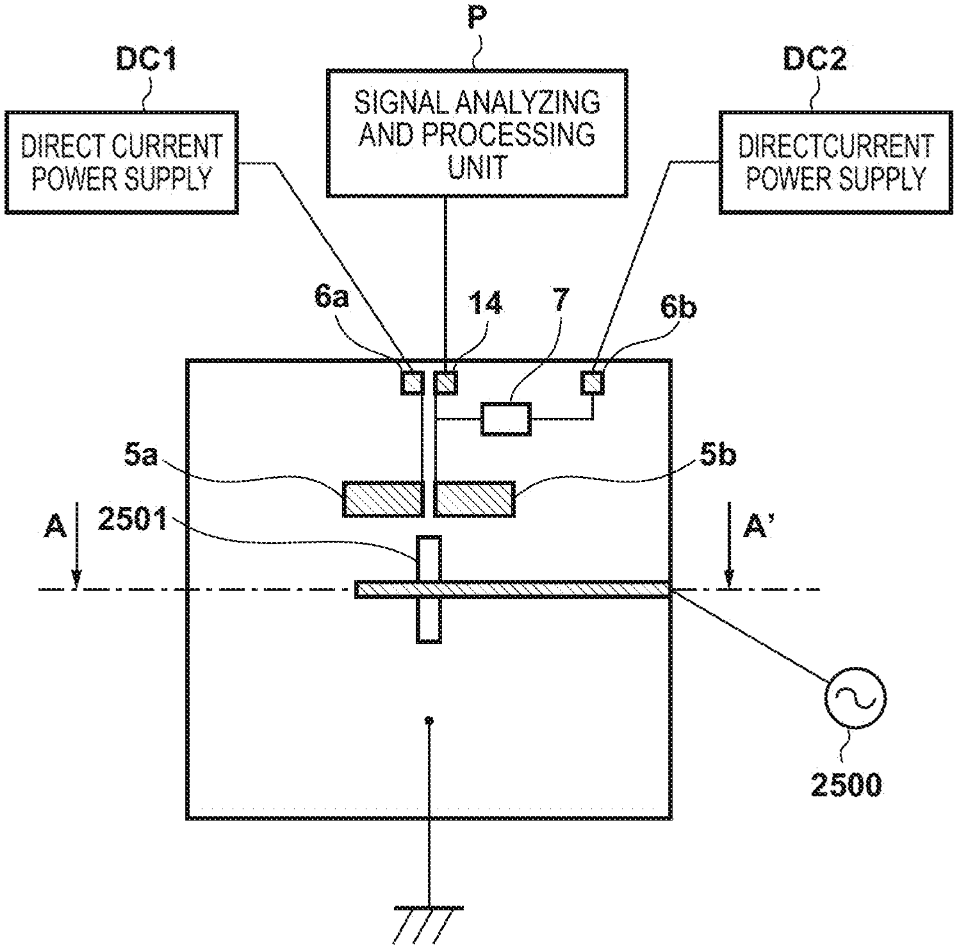
FIG. 25 is an explanatory view of external injection locking.

FIG. 24B is a block diagram of the direct conversion method. In this method, the received signal is directly down-converted into a modulation component by the local oscillator 2206 having the same frequency as that of the carrier wave that is received by the first mixer 2205. In this method as well, the reception apparatus is formed on the semiconductor substrate up to the first mixer 2205, and the demodulator 2203 is implemented by a detection circuit outside the semiconductor substrate. By performing signal processing for the communication signal, it is possible to perform an operation as a communication apparatus.

Each of the above-described embodiments assumes that carriers are electrons. However, the present invention is not limited to this and holes may be used. Furthermore, the materials of the substrate and the dielectric are selected in accordance with an application purpose, and a semiconductor layer of silicon, gallium arsenide, indium arsenide, gallium phosphide, or the like, glass, ceramic, and a resin such as polytetrafluoroethylene or polyethylene terephthalate can be used.

In each of the above-described embodiments, a square patch antenna is used as a terahertz wave resonator but the shape of the resonator is not limited to this. For example, a resonator having a structure using a patch conductor having a polygonal shape such as a rectangular shape or triangular shape, a circular shape, an elliptical shape, or the like may be used.

The number of negative differential resistance elements integrated in an element is not limited to one and a resonator including a plurality of negative differential resistance elements may be used. The number of lines is not limited to one, and an arrangement including a plurality of lines may be used. By using the antenna apparatus described in each of the above embodiments, it is possible to oscillate and detect a terahertz wave.

In each of the above-described embodiments, a dual barrier RTD made of InGaAs/AlAs growing on the InP substrate has been described as an RTD. However, the present invention is not limited to the structure and material system, and even another combination of a structure and a material can provide an element of the present invention. For example, an RTD having a triple-barrier quantum well structure or an RTD having a multi-barrier quantum well structure of four or more barriers may be used.

As the material of the RTD, each of the following combinations may be used.

- GaAs/AlGaAs, GaAs/AlAs, and InGaAs/GaAs/AlAs formed on a GaAs substrate
- InGaAs/InAlAs, InGaAs/AlAs, and InGaAs/AlGaAsSb formed on an InP substrate
- InAs/AlAsSb and InAs/AlSb formed on an InAs substrate
- SiGe/SiGe formed on an Si substrate The above-described structure and material can appropriately be selected in accordance with a desired frequency and the like.

Summary of Embodiments

At least some of the above-described embodiments are summarized as follows.

(Item 1)

An antenna apparatus characterized by comprising:

on a semiconductor substrate,

- a first active antenna including a first antenna configured to transmit or receive a first electromagnetic wave of a first frequency, and a first negative-resistance element;
- an oscillation unit including a resonance unit and a second negative-resistance element configured to generate a second electromagnetic wave by oscillating at a second frequency;
- a coupling wire configured to electrically connect the first active antenna and the oscillation unit;
- a first wiring electrically connected to the first negative-resistance element and configured to receive a first bias signal to be supplied to the first negative-resistance element; and
- a second wiring electrically connected to the second negative-resistance element and configured to receive a second bias signal to be supplied to the second negative-resistance element.

(Item 2)

The antenna apparatus according to Item 1, characterized in that

- the first active antenna receives the first electromagnetic wave, and
- a detection circuit configured to detect that the first active antenna receives the first electromagnetic wave is electrically connected to the first wiring.

(Item 3)

The antenna apparatus according to Item 2, characterized in that the detection circuit is capacitively coupled to the first wiring by a first electrostatic capacitance.

(Item 4)

The antenna apparatus according to Item 3, characterized in that the coupling wire is capacitively coupled to the first active antenna by a second electrostatic capacitance.

(Item 5)

The antenna apparatus according to Item 4, characterized in that the first electrostatic capacitance is larger than the second electrostatic capacitance.

(Item 6)

The antenna apparatus according to any one of Items 1 to 5, characterized in that the first negative-resistance element and the second negative-resistance element are resonant tunneling diodes.

(Item 7)

The antenna apparatus according to any one of Items 1 to 6, characterized in that the second bias signal has a bias voltage that generates a negative resistance in the second negative-resistance element.

(Item 8)

The antenna apparatus according to any one of Items 1 to 7, characterized in that the first bias signal has a bias voltage that generates a positive resistance in the first negative-resistance element.

(Item 9)

The antenna apparatus according to any one of Items 1 to 8, characterized in that the first bias signal has a bias voltage that generates a negative resistance in the first negative-resistance element.

(Item 10)

The antenna apparatus according to Item 9, characterized in that the first active antenna oscillates at the second frequency of the second electromagnetic wave injected via the coupling wire.

(Item 11)

The antenna apparatus according to Item 9, characterized in that the first negative-resistance element amplifies a signal to be propagated to the first active antenna.

(Item 12)

The antenna apparatus according to any one of Items 1 to 11, characterized in that the second frequency is equal to the first frequency.

(Item 13)

The antenna apparatus according to Item 12, characterized in that the antenna apparatus operates as a homodyne detector.

(Item 14)

The antenna apparatus according to any one of Items 1 to 11, characterized in that the second frequency is different from the first frequency.

(Item 15)

The antenna apparatus according to Item 14, characterized in that a bias control unit configured to control the second bias signal is connected to the second wiring, and the bias control unit controls the second bias signal so as not to cause injection locking with respect to an electromagnetic wave of the first frequency in a case where power injected to the first active antenna from the oscillation unit via the coupling wire at the time of receiving the first electromagnetic wave falls within a predetermined range of intensity of the electromagnetic wave propagated to the first active antenna.

(Item 16)

The antenna apparatus according to Item 14 or 15, characterized in that a bias control unit configured to control the second bias signal is connected to the second wiring, and the bias control unit controls the second bias signal so as to cause injection locking with respect to an electromagnetic wave of the first frequency in a case where power injected to the first active antenna from the oscillation unit via the coupling wire at the time of receiving the first electromagnetic wave falls within a predetermined range of intensity of the electromagnetic wave propagated to the first active antenna.

(Item 17)

The antenna apparatus according to Item 14 or 15, characterized in that a bias control unit configured to control the second bias signal is connected to the second wiring, and the bias control unit controls the second bias signal so as to cause injection locking with respect to an electromagnetic wave of the first frequency only in a case where power injected to the first active antenna from the oscillation unit via the coupling wire at the time of receiving the first electromagnetic wave falls within a predetermined range of intensity of the electromagnetic wave propagated to the first active antenna and the intensity of the electromagnetic wave is larger than a predetermined threshold.

(Item 18)

The antenna apparatus according to any one of Items 14 to 17, characterized in that in a case where the first active antenna does not perform injection locking by the first electromagnetic wave, the first active antenna operates as a heterodyne detector.

(Item 19)

The antenna apparatus according to any one of Items 14 to 17, characterized in that in a case where the first active antenna performs injection locking by the first electromagnetic wave, the first active antenna operates as a homodyne detector.

(Item 20)

The antenna apparatus according to any one of Items 1 to 19, characterized in that in a case where the first active antenna oscillates at the second frequency and receives the first electromagnetic wave, the first active antenna generates a third electromagnetic wave of a third frequency, and the first active antenna mixes the first electromagnetic wave and the third electromagnetic wave to generate a fourth electromagnetic wave of a fourth frequency lower than the first frequency and the third frequency.

(Item 21)

The antenna apparatus according to any one of Items 1 to 20, characterized in that a bias voltage is applied to the first antenna of the first active antenna.

(Item 22)

The antenna apparatus according to any one of Items 1 to 21, characterized in that the first antenna is a patch antenna.

(Item 23)

The antenna apparatus according to any one of Items 1 to 22, characterized in that the oscillation unit is a microstrip-line resonator.

(Item 24)

The antenna apparatus according to Item 23, characterized in that the coupling wire electrically connects the first antenna and a resonance unit of the oscillation unit.

(Item 25)

The antenna apparatus according to any one of Items 1 to 24, characterized by further comprising:

a second active antenna including a second antenna configured to transmit or receive an electromagnetic wave of the first frequency and a third negative-resistance element, wherein the first active antenna and the second active antenna are electrically connected by a coupling wire different from the coupling wire.

(Item 26)

The antenna apparatus according to any one of Items 1 to 25, characterized in that the two oscillation units connected by a coupling wire different from the coupling wire are provided.

(Item 27)

The antenna apparatus according to Item 25, characterized in that the first active antenna receives a signal from the oscillation unit at a first phase, and the second active antenna receives a signal from the oscillation unit at a second phase different from the first phase.

(Item 28)

The antenna apparatus according to Item 27, characterized in that line lengths of the coupling wires that connect the oscillation unit to the first active antenna and the second active antenna, respectively, are different from each other.

(Item 29)

The antenna apparatus according to Item 27 or 28, characterized in that a difference between the first phase and the second phase is □/4.

(Item 30)

The antenna apparatus according to any one of Items 1 to 29, characterized in that the oscillation unit includes a third active antenna including a third antenna and a third negative-resistance element, and the third active antenna functions as a transmission antenna configured to emit an electromagnetic wave of the second frequency.

(Item 31)

The antenna apparatus according to Item 30, characterized in that the coupling wire electrically connects the first antenna of the first active antenna and the third antenna of the third active antenna.

(Item 32)

The antenna apparatus according to any one of Items 1 to 31, characterized in that the coupling wire is a microstrip line.

(Item 33)

The antenna apparatus according to any one of Items 1 to 32, characterized in that the first electromagnetic wave and the second electromagnetic wave are electromagnetic waves in a terahertz band.

(Item 34)

The antenna apparatus according to any one of Items 1 to 33, characterized in that the first negative-resistance element and the second negative-resistance element are formed in the same layer on the semiconductor substrate.

(Item 35)

A communication apparatus characterized by comprising:
an antenna apparatus defined in any one of Items 1 to 34;
a transmission unit configured to emit an electromagnetic wave of a first frequency; and
a reception unit configured to detect the electromagnetic wave of the first frequency.

(Item 36)

An image capturing system characterized by comprising:
an antenna apparatus defined in any one of Items 1 to 34;
a transmission unit configured to emit an electromagnetic wave of a first frequency to an object; and
a detection unit configured to detect the electromagnetic wave of the first frequency reflected by the object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An antenna apparatus comprising:
on a semiconductor substrate,
a first active antenna including a first antenna configured to transmit or receive a first electromagnetic wave of a first frequency, and a first negative-resistance element;
an oscillation unit including a resonance unit and a second negative-resistance element configured to generate a second electromagnetic wave by oscillating at a second frequency;
a coupling wire configured to electrically connect the first active antenna and the oscillation unit;
a first wiring electrically connected to the first negative-resistance element and configured to receive a first bias signal to be supplied to the first negative-resistance element; and
a second wiring electrically connected to the second negative-resistance element and configured to receive a second bias signal to be supplied to the second negative-resistance element.

2. The antenna apparatus according to claim 1, wherein the first active antenna receives the first electromagnetic wave, and
a detection circuit configured to detect that the first active antenna receives the first electromagnetic wave is electrically connected to the first wiring.

3. The antenna apparatus according to claim 2, characterized in that the detection circuit is capacitively coupled to the first wiring by a first electrostatic capacitance.

4. The antenna apparatus according to claim 3, wherein the coupling wire is capacitively coupled to the first active antenna by a second electrostatic capacitance.

5. The antenna apparatus according to claim 4, wherein the first electrostatic capacitance is larger than the second electrostatic capacitance.

6. The antenna apparatus according to claim 1, wherein the first negative-resistance element and the second negative-resistance element are resonant tunneling diodes.

7. The antenna apparatus according to claim 1, wherein the second bias signal has a bias voltage that generates a negative resistance in the second negative-resistance element.

8. The antenna apparatus according to claim 1, wherein the first bias signal has a bias voltage that generates a positive resistance in the first negative-resistance element.

9. The antenna apparatus according to claim 1, wherein the first bias signal has a bias voltage that generates a negative resistance in the first negative-resistance element.

10. The antenna apparatus according to claim 9, wherein the first active antenna oscillates at the second frequency of the second electromagnetic wave injected via the coupling wire.

11. The antenna apparatus according to claim 9, wherein the first negative-resistance element amplifies a signal to be propagated to the first active antenna.

12. The antenna apparatus according to claim 1, wherein the second frequency is equal to the first frequency.

13. The antenna apparatus according to claim 12, wherein the antenna apparatus operates as a homodyne detector.

14. The antenna apparatus according to claim 1, wherein the second frequency is different from the first frequency.

15. The antenna apparatus according to claim 14, wherein
a bias control unit configured to control the second bias signal is connected to the second wiring, and
the bias control unit controls the second bias signal so as not to cause injection locking with respect to an electromagnetic wave of the first frequency in a case where power injected to the first active antenna from the oscillation unit via the coupling wire at the time of receiving the first electromagnetic wave falls within a predetermined range of intensity of the electromagnetic wave propagated to the first active antenna.

16. The antenna apparatus according to claim 14, wherein
a bias control unit configured to control the second bias signal is connected to the second wiring, and
the bias control unit controls the second bias signal so as to cause injection locking with respect to an electromagnetic wave of the first frequency in a case where power injected to the first active antenna from the oscillation unit via the coupling wire at the time of receiving the first electromagnetic wave falls within a predetermined range of intensity of the electromagnetic wave propagated to the first active antenna.

17. The antenna apparatus according to claim 14, wherein
a bias control unit configured to control the second bias signal is connected to the second wiring, and
the bias control unit controls the second bias signal so as to cause injection locking with respect to an electromagnetic wave of the first frequency only in a case where power injected to the first active antenna from the oscillation unit via the coupling wire at the time of receiving the first electromagnetic wave falls within a predetermined range of intensity of the electromagnetic wave propagated to the first active antenna and the intensity of the electromagnetic wave is larger than a predetermined threshold.

18. The antenna apparatus according to claim 14, wherein in a case where the first active antenna does not perform injection locking by the first electromagnetic wave, the first active antenna operates as a heterodyne detector.

19. The antenna apparatus according to claim 14, wherein in a case where the first active antenna performs injection locking by the first electromagnetic wave, the first active antenna operates as a homodyne detector.

20. The antenna apparatus according to claim 1, wherein in a case where the first active antenna oscillates at the second frequency and receives the first electromagnetic wave, the first active antenna generates a third electromagnetic wave of a third frequency, and the first active antenna mixes the first electromagnetic wave and the third electromagnetic wave to generate a fourth electromagnetic wave of a fourth frequency lower than the first frequency and the third frequency.

21. The antenna apparatus according to claim 1, wherein a bias voltage is applied to the first antenna of the first active antenna.

22. The antenna apparatus according to claim 1, wherein the first antenna is a patch antenna.

23. The antenna apparatus according to claim 1, wherein the oscillation unit is a microstrip-line resonator.

24. The antenna apparatus according to claim 23, wherein the coupling wire electrically connects the first antenna and a resonance unit of the oscillation unit.

25. The antenna apparatus according to claim 1, further comprising:

a second active antenna including a second antenna configured to transmit or receive an electromagnetic wave of the first frequency and a third negative-resistance element, wherein the first active antenna and the second active antenna are electrically connected by a coupling wire different from the coupling wire.

26. The antenna apparatus according to claim 1, wherein the two oscillation units connected by a coupling wire different from the coupling wire are provided.

27. The antenna apparatus according to claim 25, wherein the first active antenna receives a signal from the oscillation unit at a first phase, and the second active antenna receives a signal from the oscillation unit at a second phase different from the first phase.

28. The antenna apparatus according to claim 27, wherein line lengths of the coupling wires that connect the oscillation unit to the first active antenna and the second active antenna, respectively, are different from each other.

29. The antenna apparatus according to claim 27, wherein a difference between the first phase and the second phase is $\pi/4$.

30. The antenna apparatus according to claim 1, wherein the oscillation unit includes a third active antenna including a third antenna and a third negative-resistance element, and the third active antenna functions as a transmission antenna configured to emit an electromagnetic wave of the second frequency.

31. The antenna apparatus according to claim 30, wherein the coupling wire electrically connects the first antenna of the first active antenna and the third antenna of the third active antenna.

32. The antenna apparatus according to claim 1, wherein the coupling wire is a microstrip line.

33. The antenna apparatus according to claim 1, wherein the first electromagnetic wave and the second electromagnetic wave are electromagnetic waves in a terahertz band.

34. The antenna apparatus according to claim 1, wherein the first negative-resistance element and the second negative-resistance element are formed in the same layer on the semiconductor substrate.

35. A communication apparatus comprising:

an antenna apparatus defined in claim 1;

a transmission unit configured to emit an electromagnetic wave of a first frequency; and a reception unit configured to detect the electromagnetic wave of the first frequency.

36. An image capturing system comprising:

an antenna apparatus defined in claim 1;

a transmission unit configured to emit an electromagnetic wave of a first frequency to an object; and a detection unit configured to detect the electromagnetic wave of the first frequency reflected by the object.

* * * * *